"(12) United States Patent
Kikuchi

(10) Patent No.: US 12,007,541 B2
(45) Date of Patent: *Jun. 11, 2024

(54) ZOOM LENS AND IMAGE CAPTURING APPARATUS

(71) Applicant: CANON KABUSHIKI KAISHA, Tokyo (JP)

(72) Inventor: Shohei Kikuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,216

(22) Filed: Aug. 16, 2022

(65) Prior Publication Data

US 2022/0390725 A1 Dec. 8, 2022

Related U.S. Application Data

(63) Continuation of application No. 16/682,602, filed on Nov. 13, 2019, now Pat. No. 11,768,361.

(30) Foreign Application Priority Data

Nov. 29, 2018 (JP) ................. 2018-224123

(51) Int. Cl.
G02B 15/14 (2006.01)
G02B 3/02 (2006.01)

(52) U.S. Cl.
CPC .  G02B 15/1461 (2019.08); G02B 15/145105 (2019.08); G02B 3/02 (2013.01)

(58) Field of Classification Search
CPC ........ G02B 15/1461; G02B 15/145105; G02B 3/02
See application file for complete search history.

(56) References Cited

U.S. PATENT DOCUMENTS

2007/0070513 A1* 3/2007 Yamashita ..... G02B 15/145113
                                               359/676
2008/0309798 A1* 12/2008 Sueyoshi ........... G02B 15/1461
                                               348/E5.051
2013/0235466 A1* 9/2013 Iwamoto .............. G02B 15/173
                                               359/683
2015/0103211 A1* 4/2015 Bito ....................... H04N 23/67
                                               359/695
2017/0115472 A1* 4/2017 Obama .......... G02B 15/144113
2017/0261728 A1* 9/2017 Shibata .............. G02B 15/1461
2020/0241264 A1* 7/2020 Umeda .......... G02B 15/145113
2022/0121021 A1* 4/2022 Makida .............. G02B 27/0025

FOREIGN PATENT DOCUMENTS

JP      2016080973 A  *  5/2016
JP      2017068155 A     4/2017
WO   WO-2020157904 A1 *  8/2020 ......... G02B 15/1461

* cited by examiner

Primary Examiner — George G. King
(74) Attorney, Agent, or Firm — CANON U.S.A., INC. IP Division

(57) ABSTRACT

A zoom lens ZL includes: a first lens unit L1 having a positive refractive power, a second lens unit L2 having a negative refractive power, and a third lens unit L3 having a positive refractive power, an N−1th lens unit, and an Nth lens unit, the lens units being arranged in order from an object side to an image side. The N−1th lens unit and the Nth lens unit are located on the image side with respect to an aperture stop SP.

14 Claims, 29 Drawing Sheets

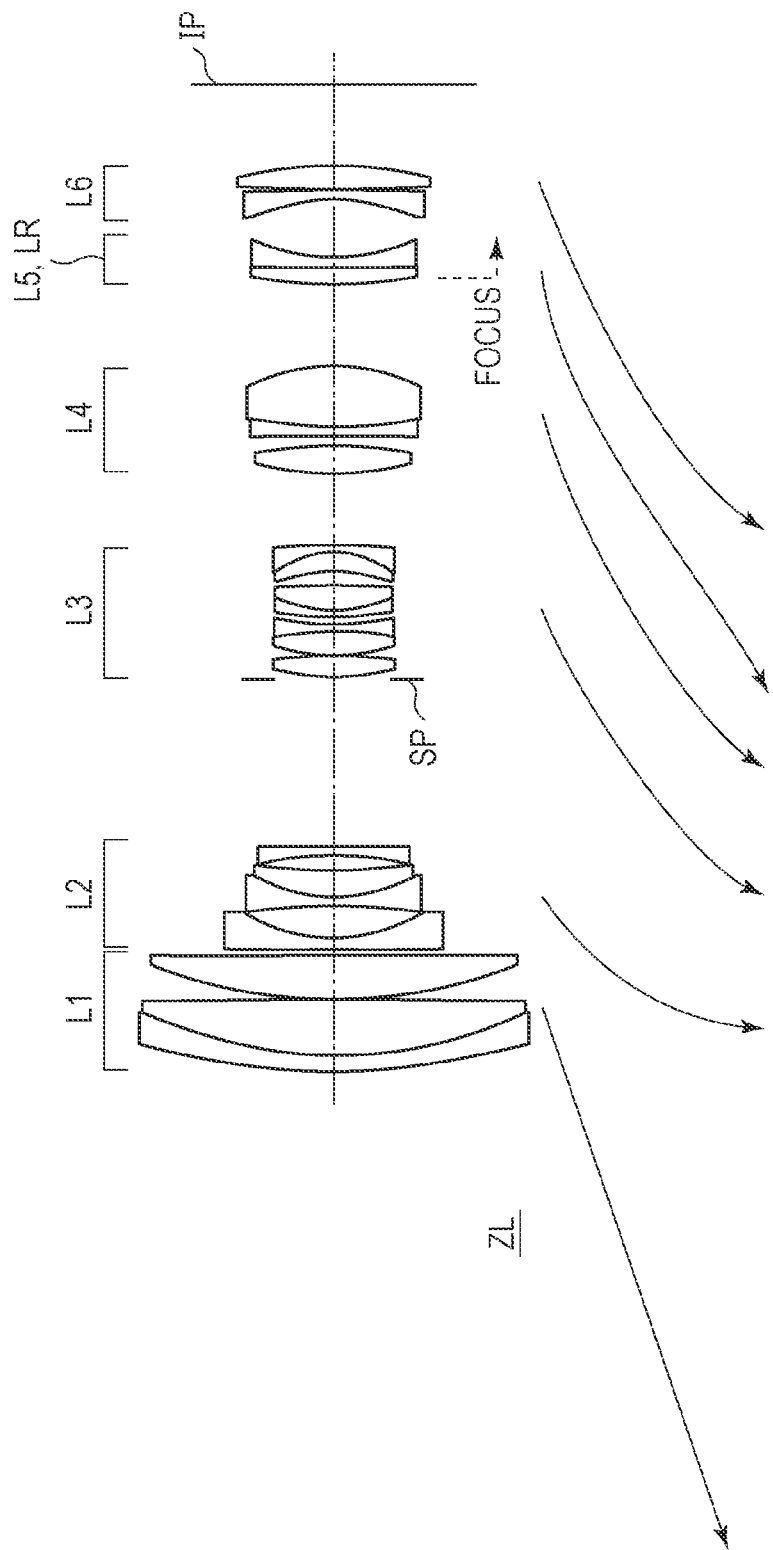

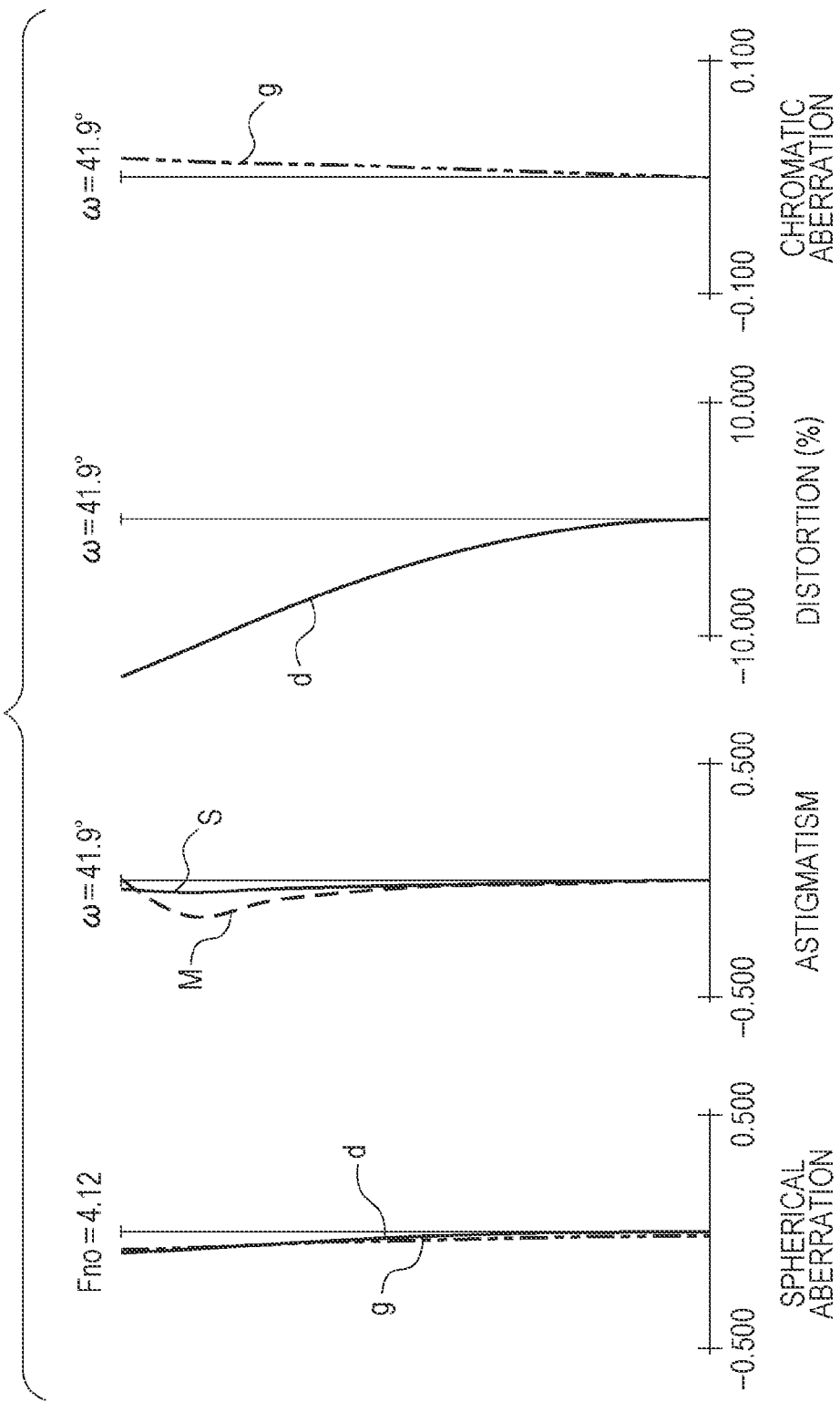

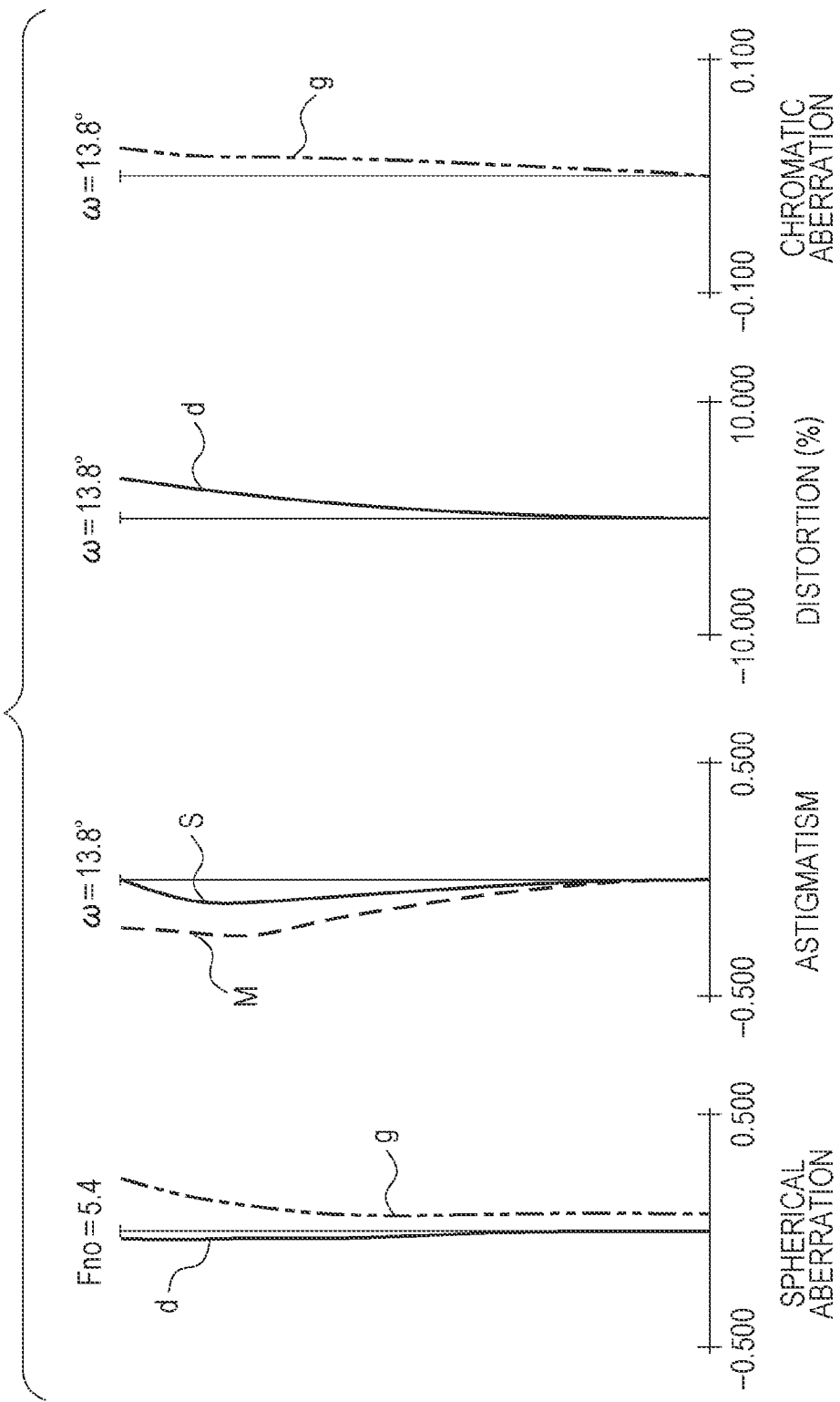

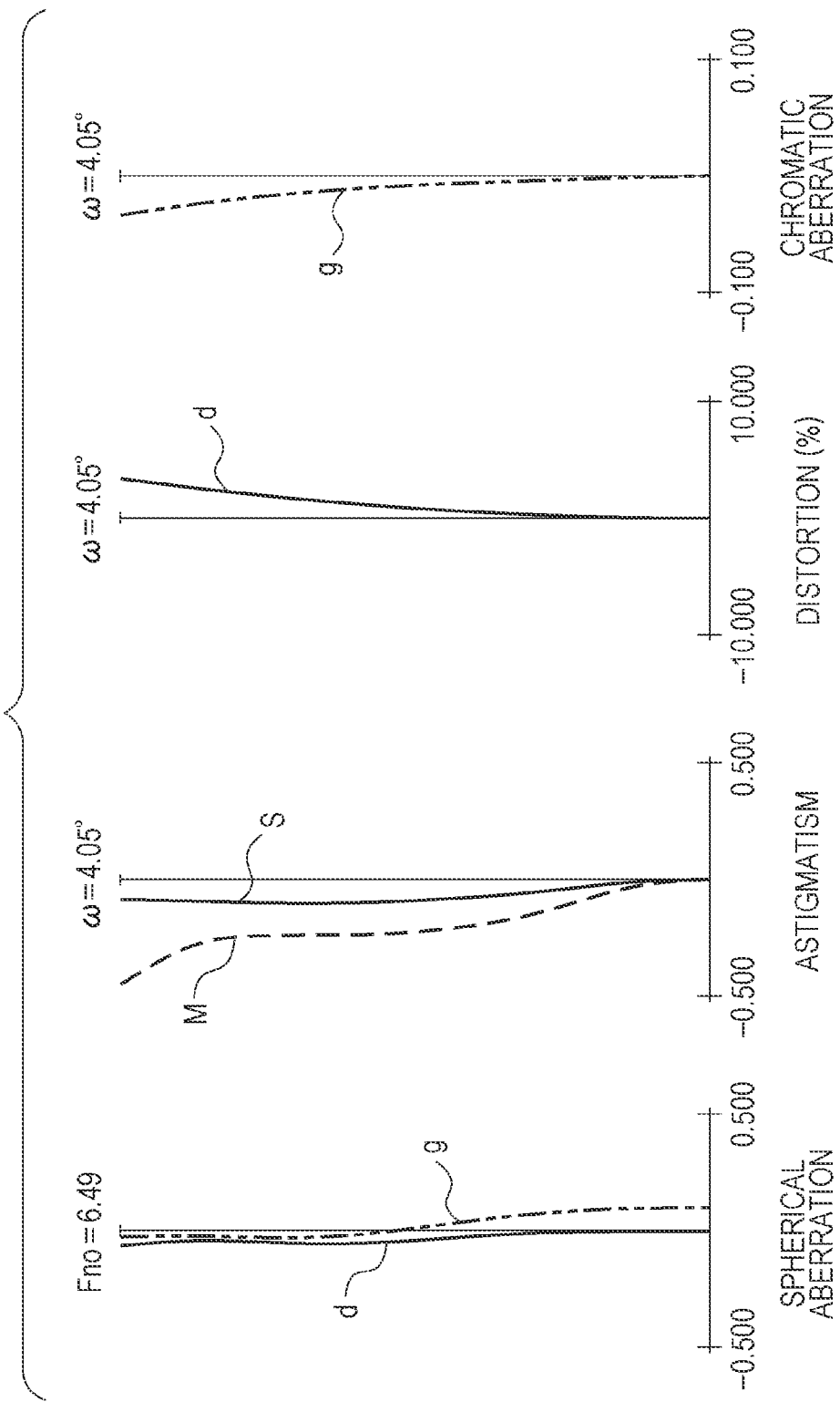

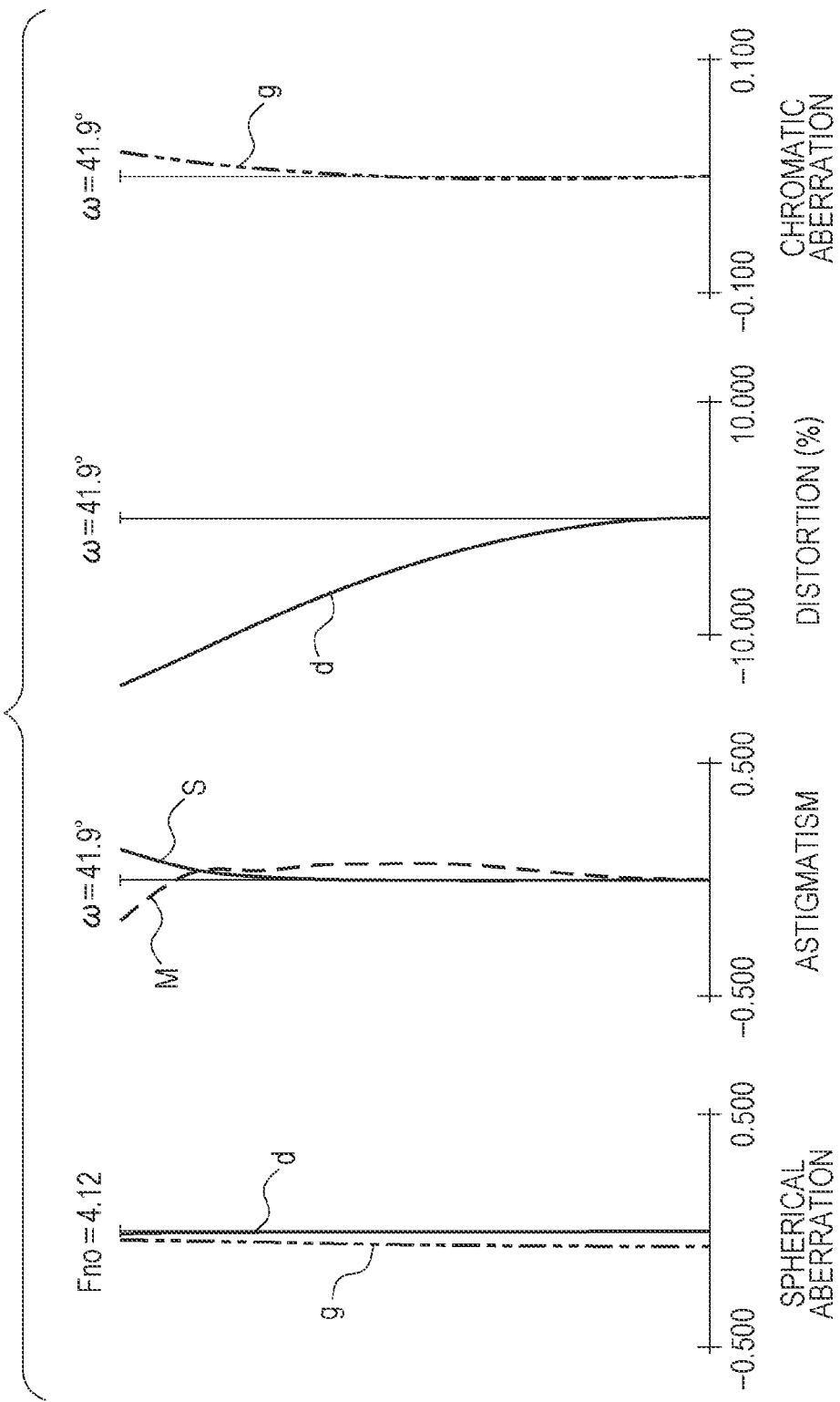

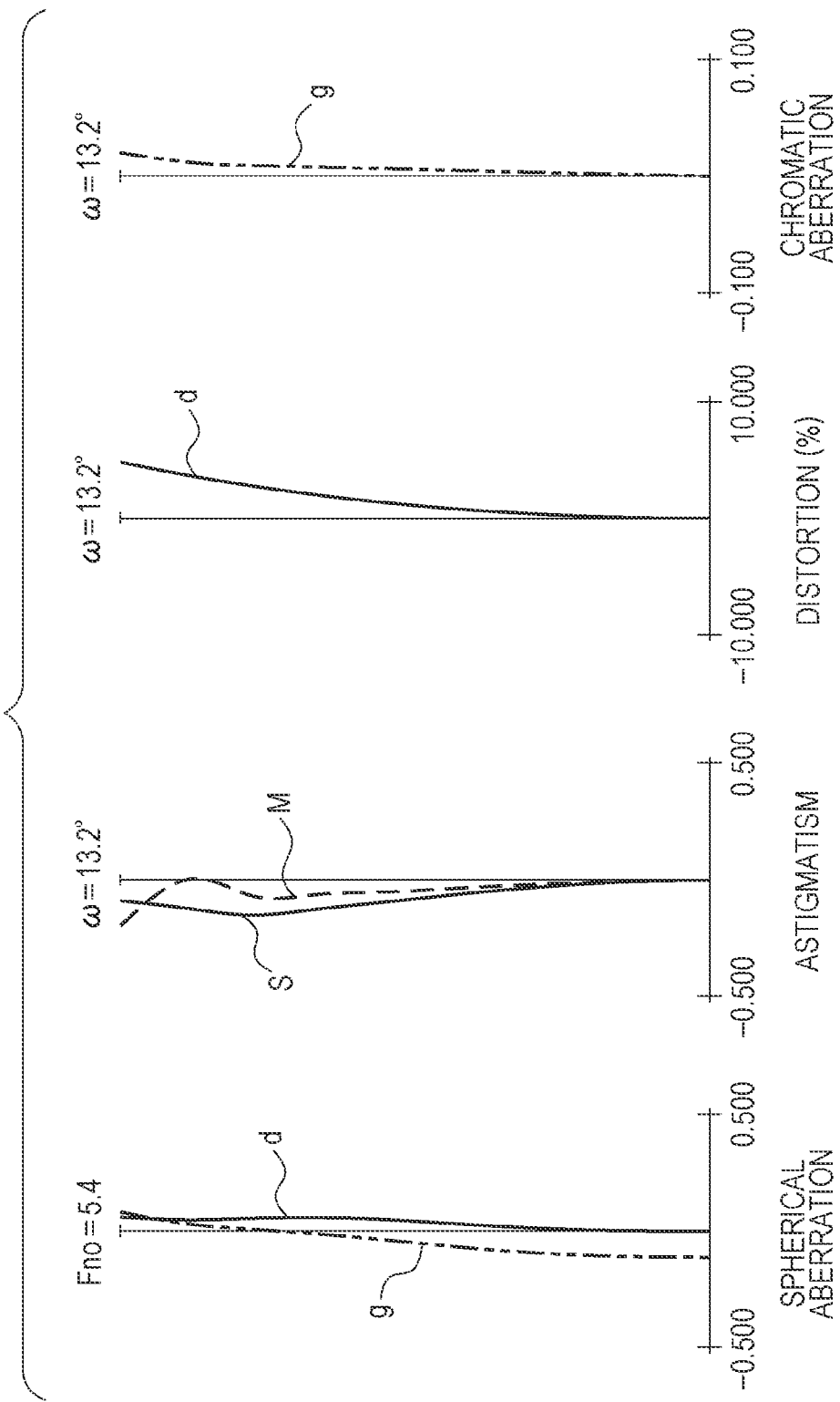

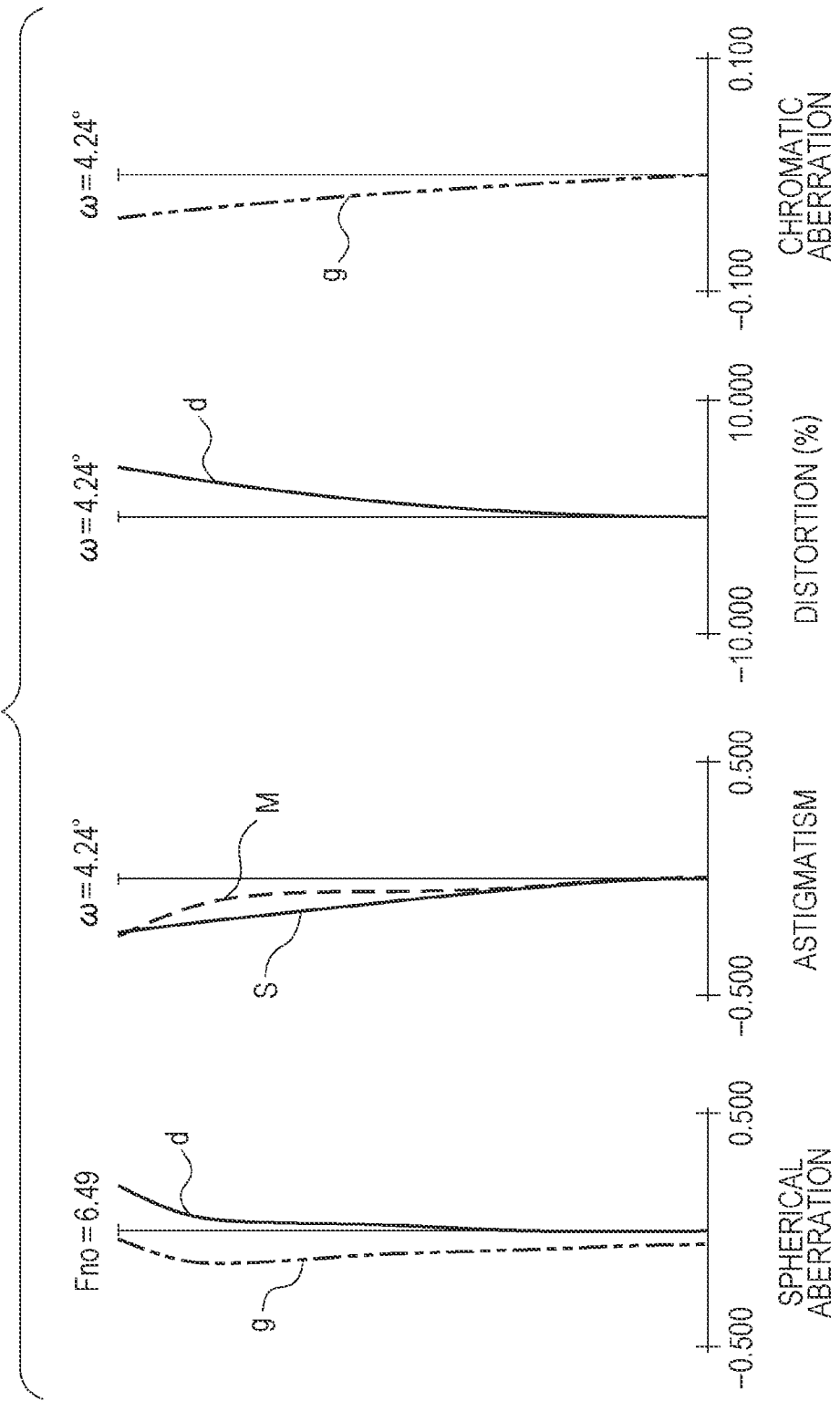

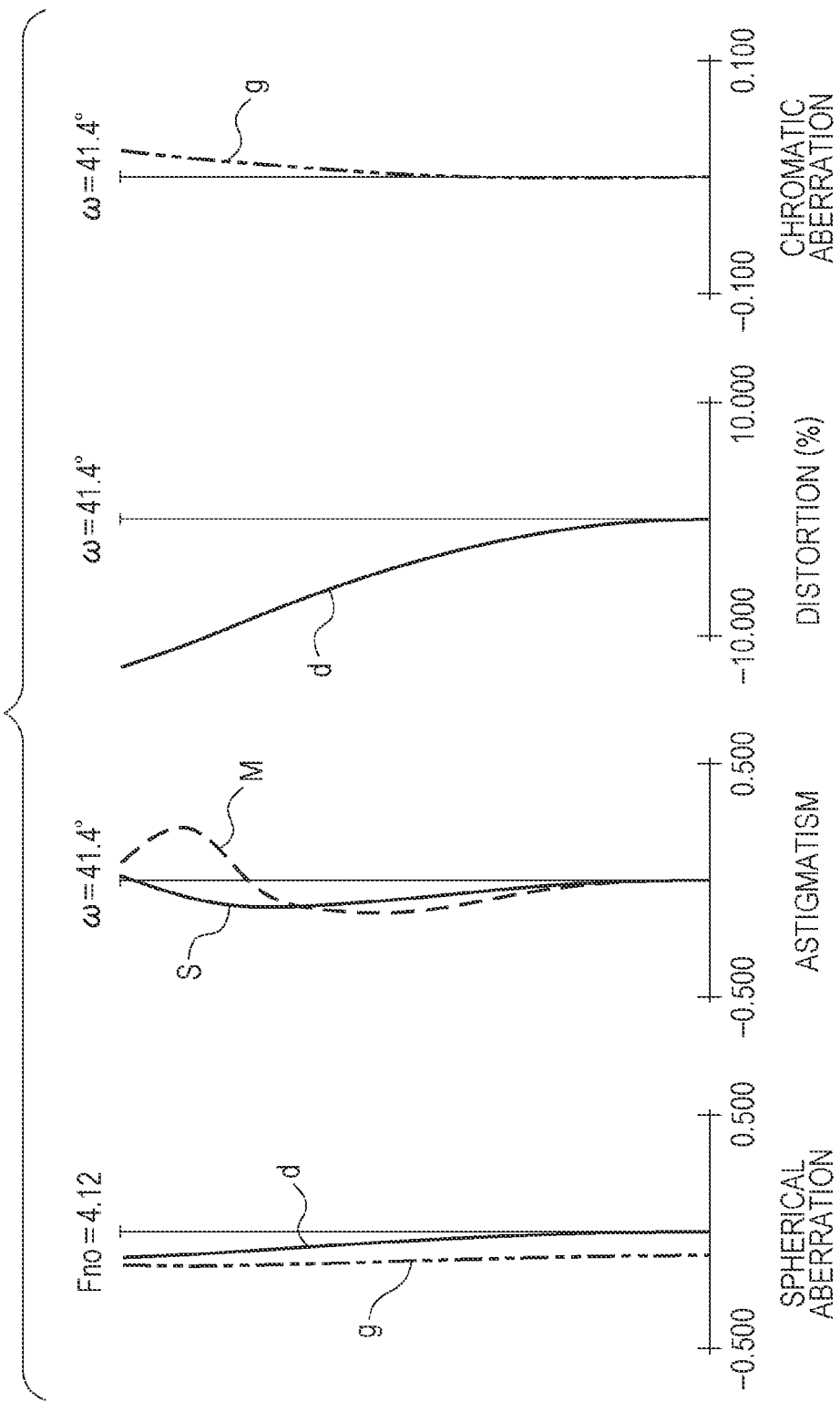

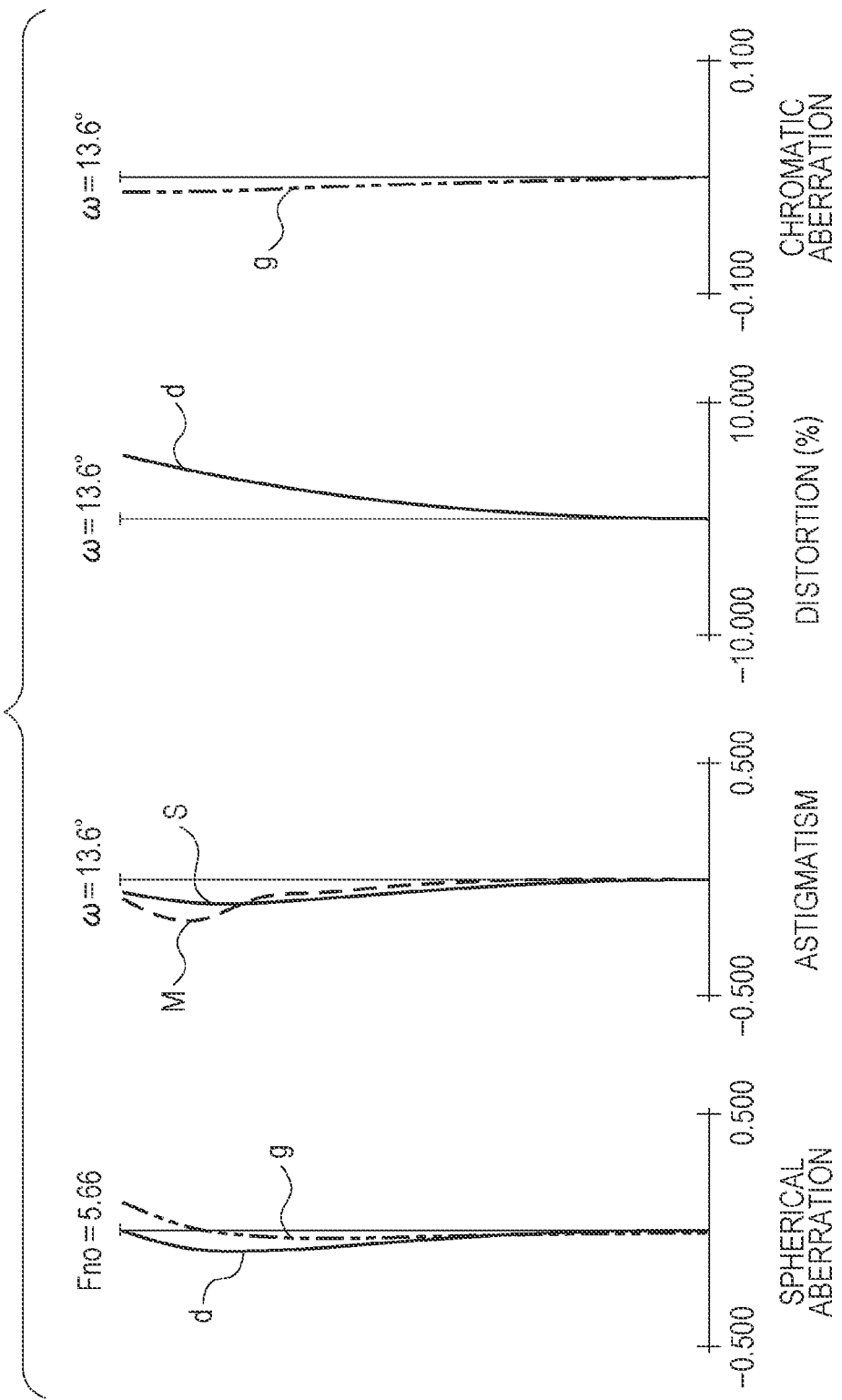

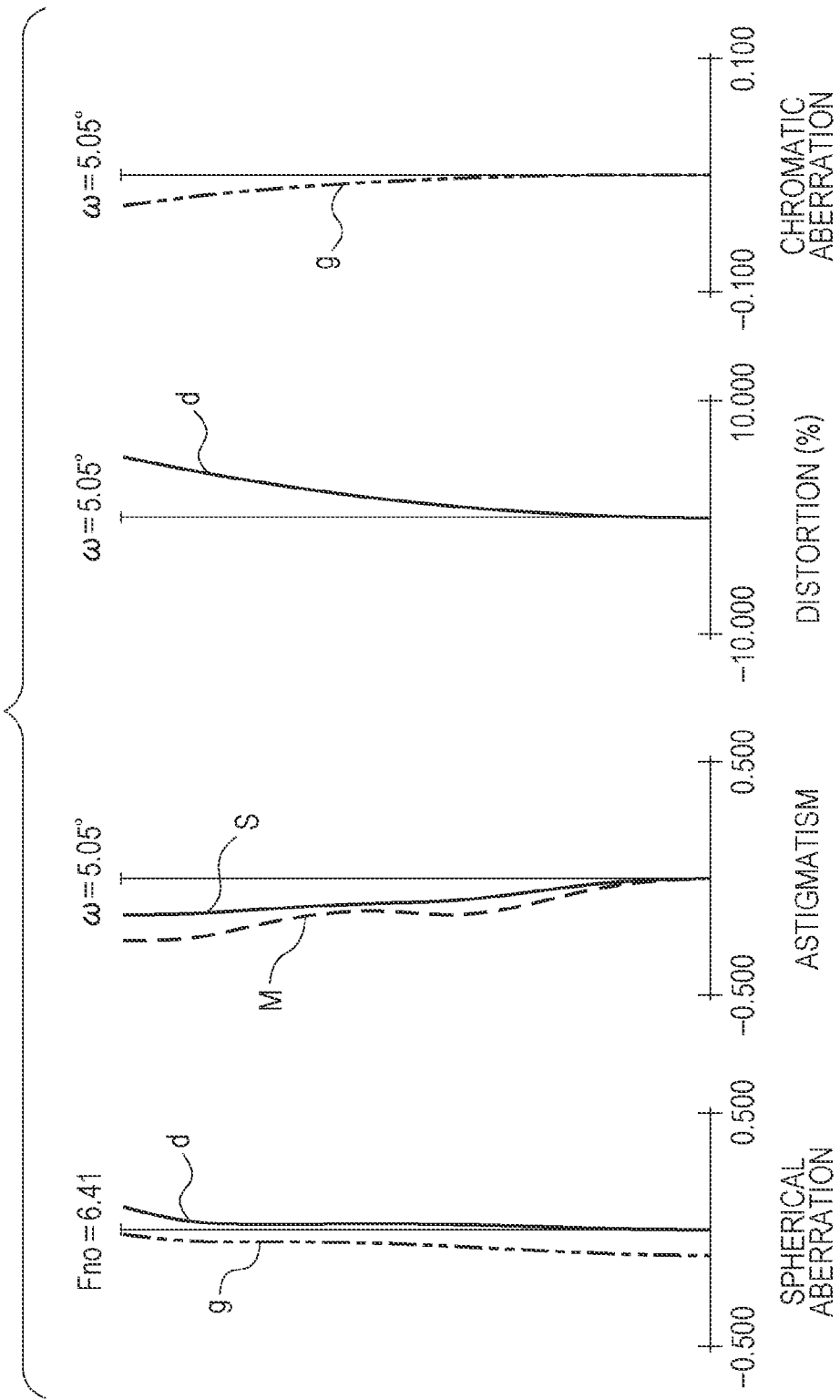

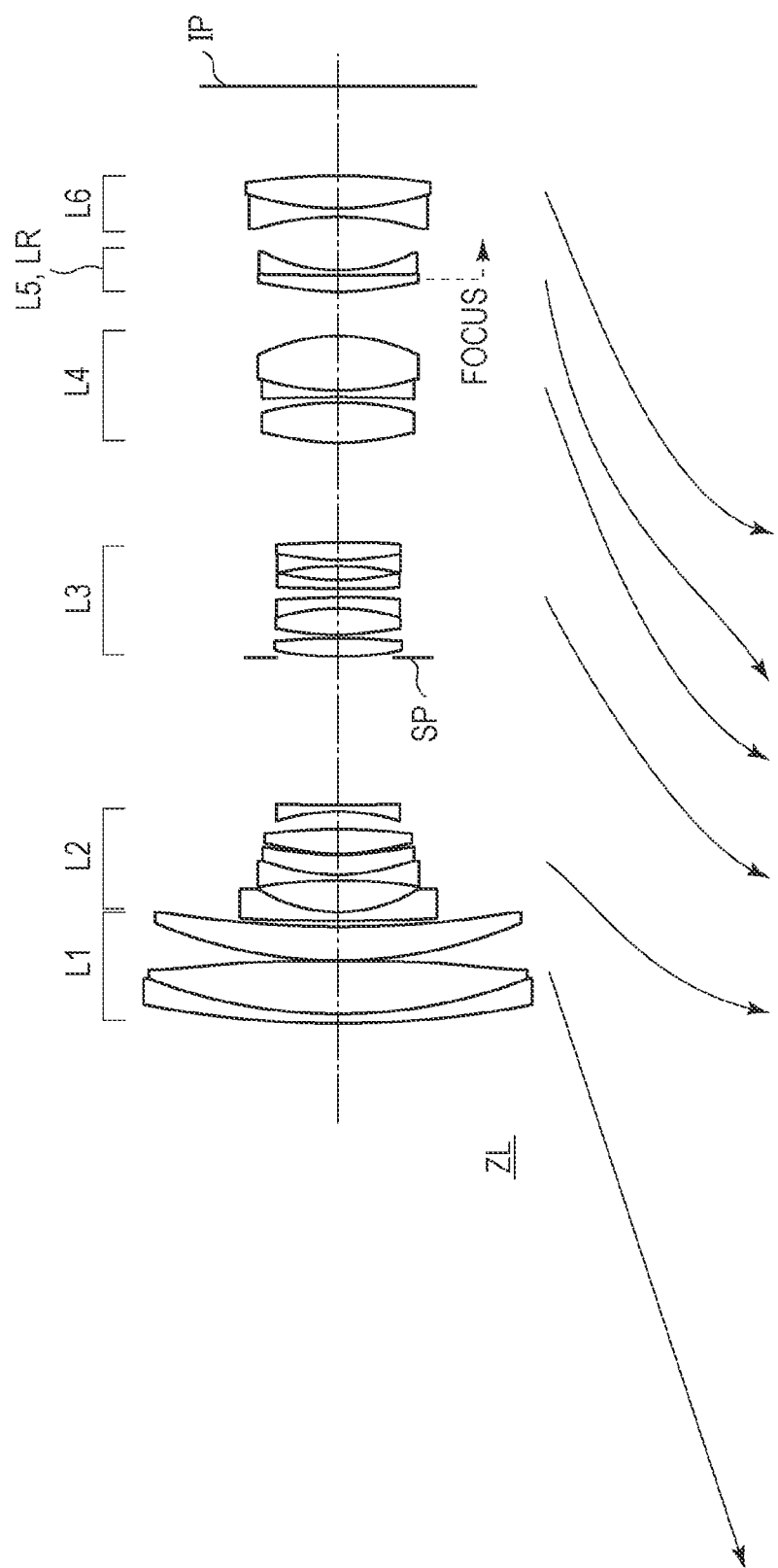

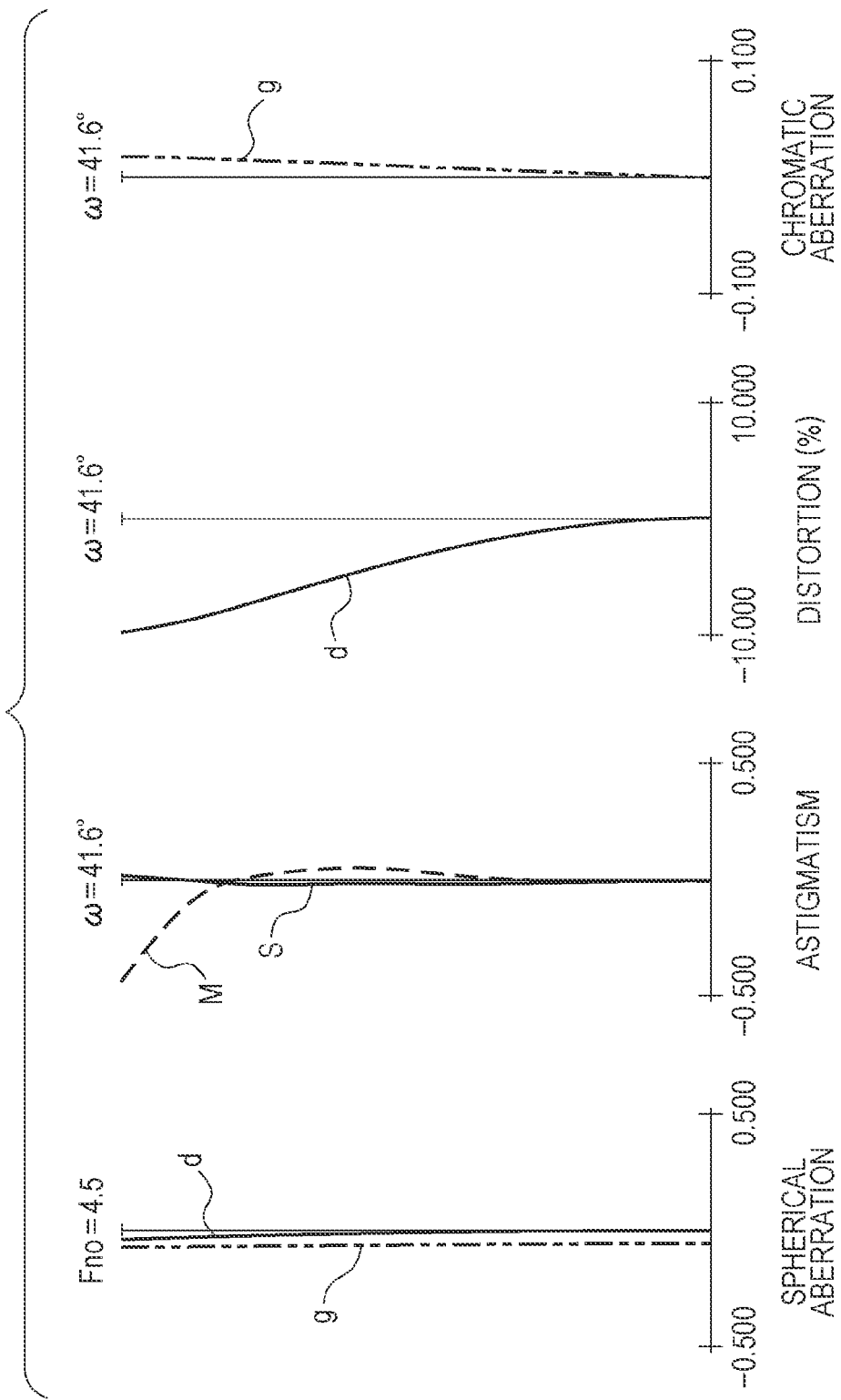

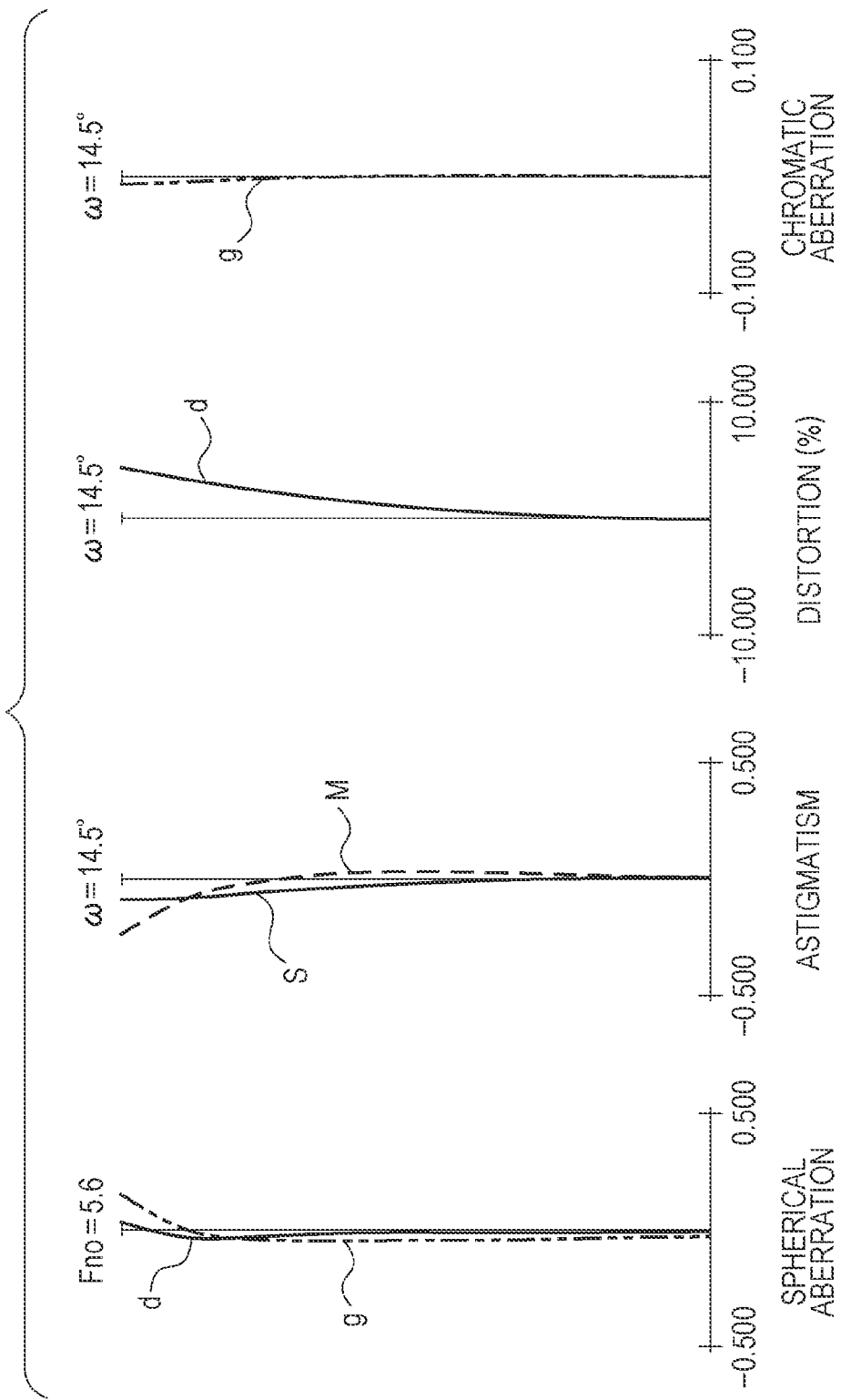

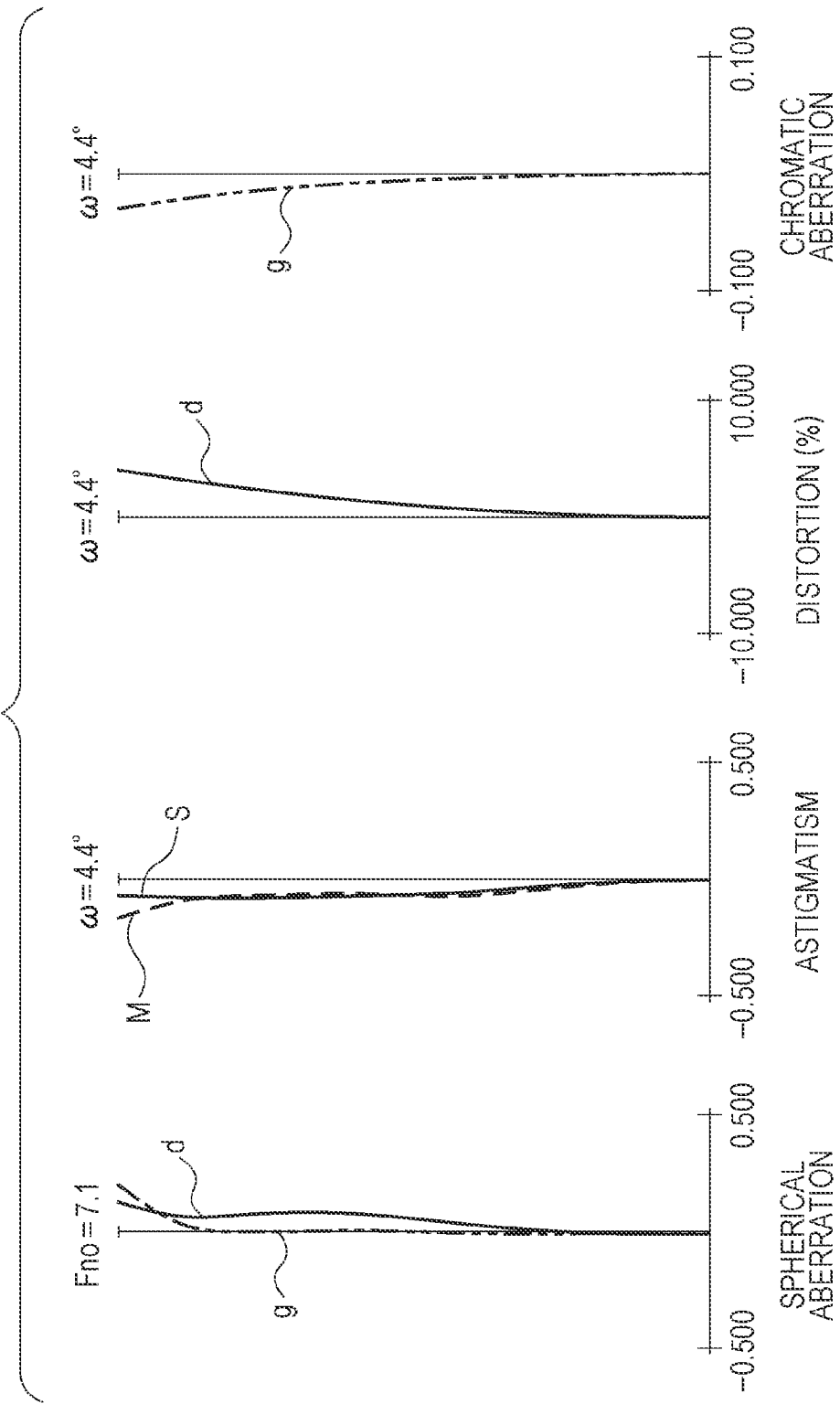

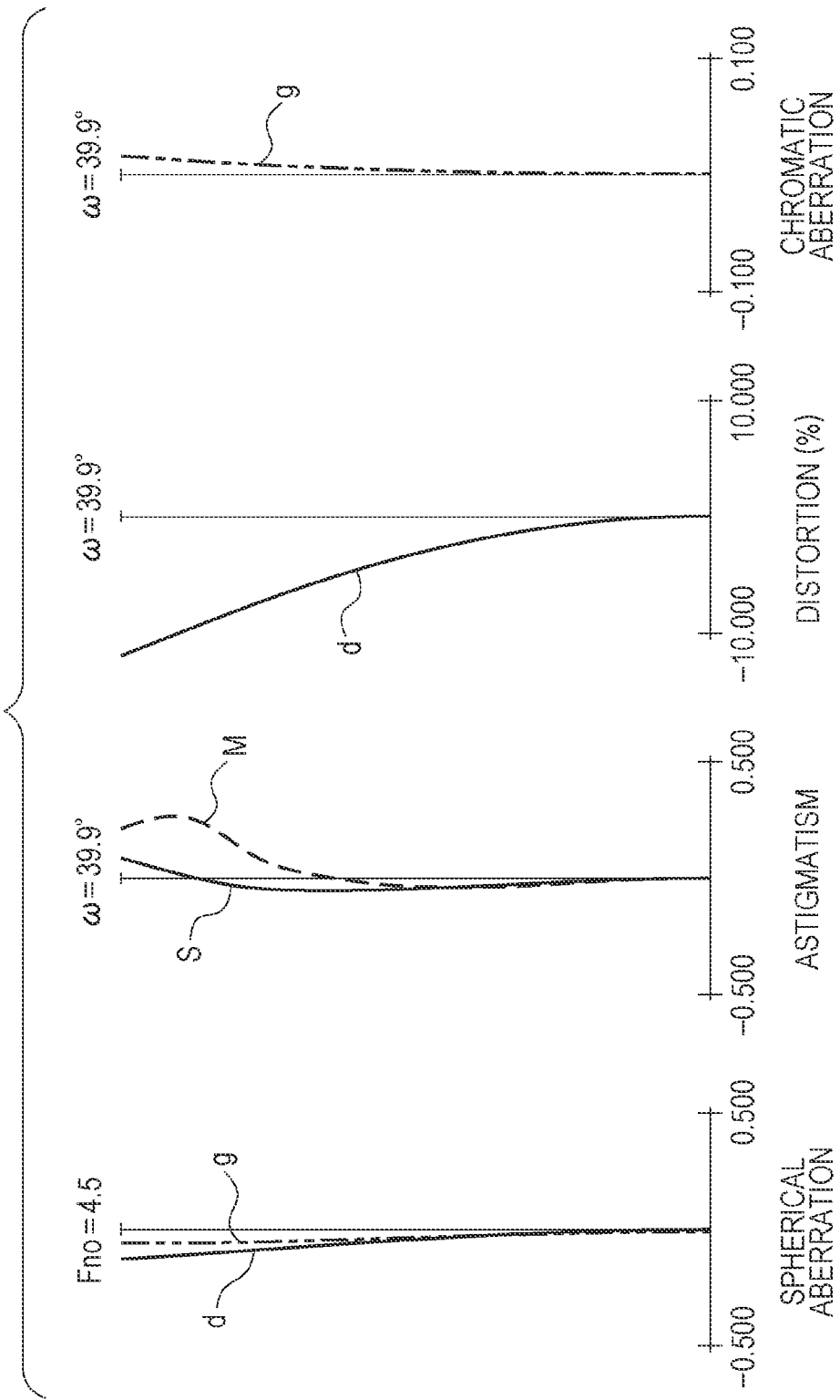

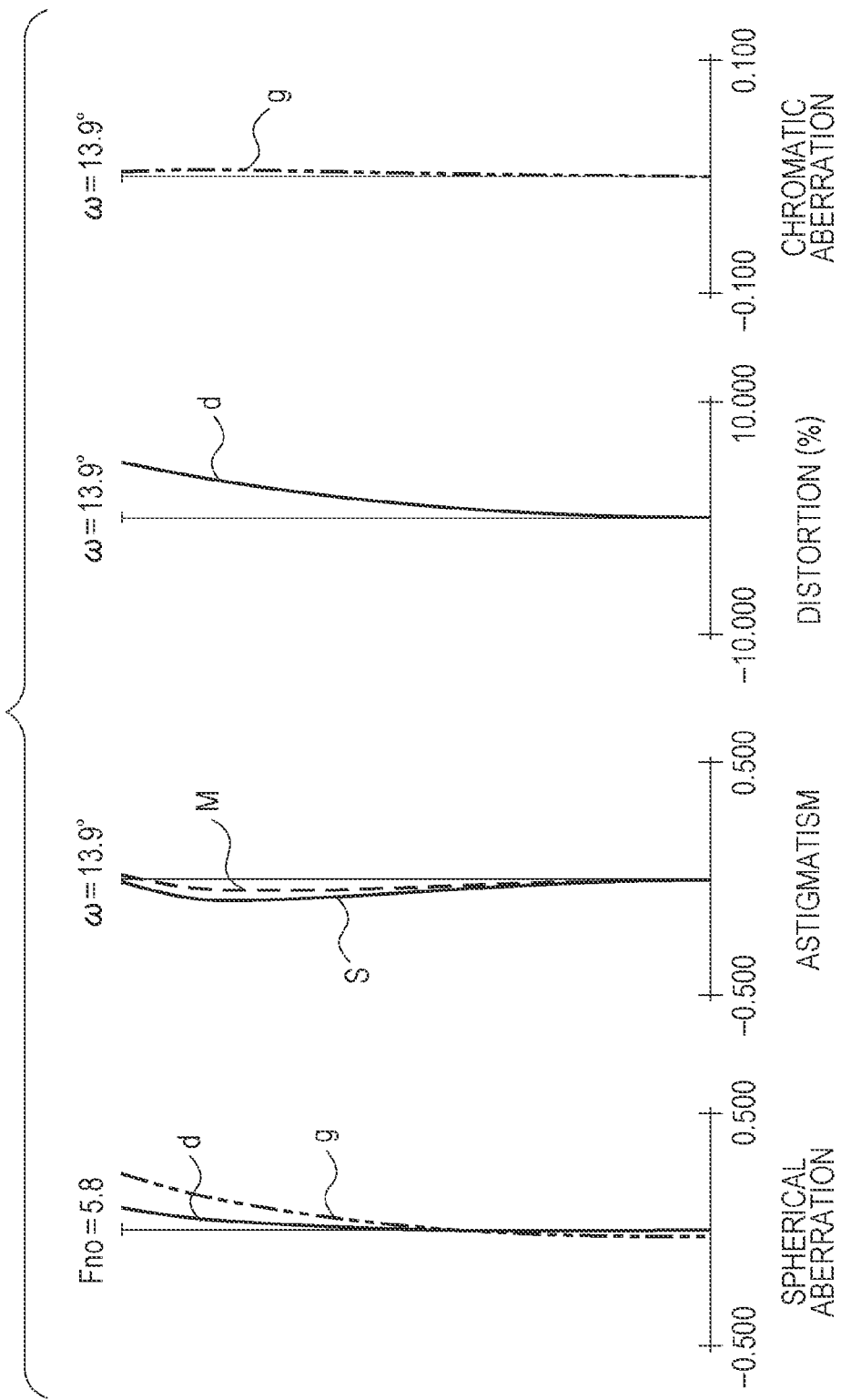

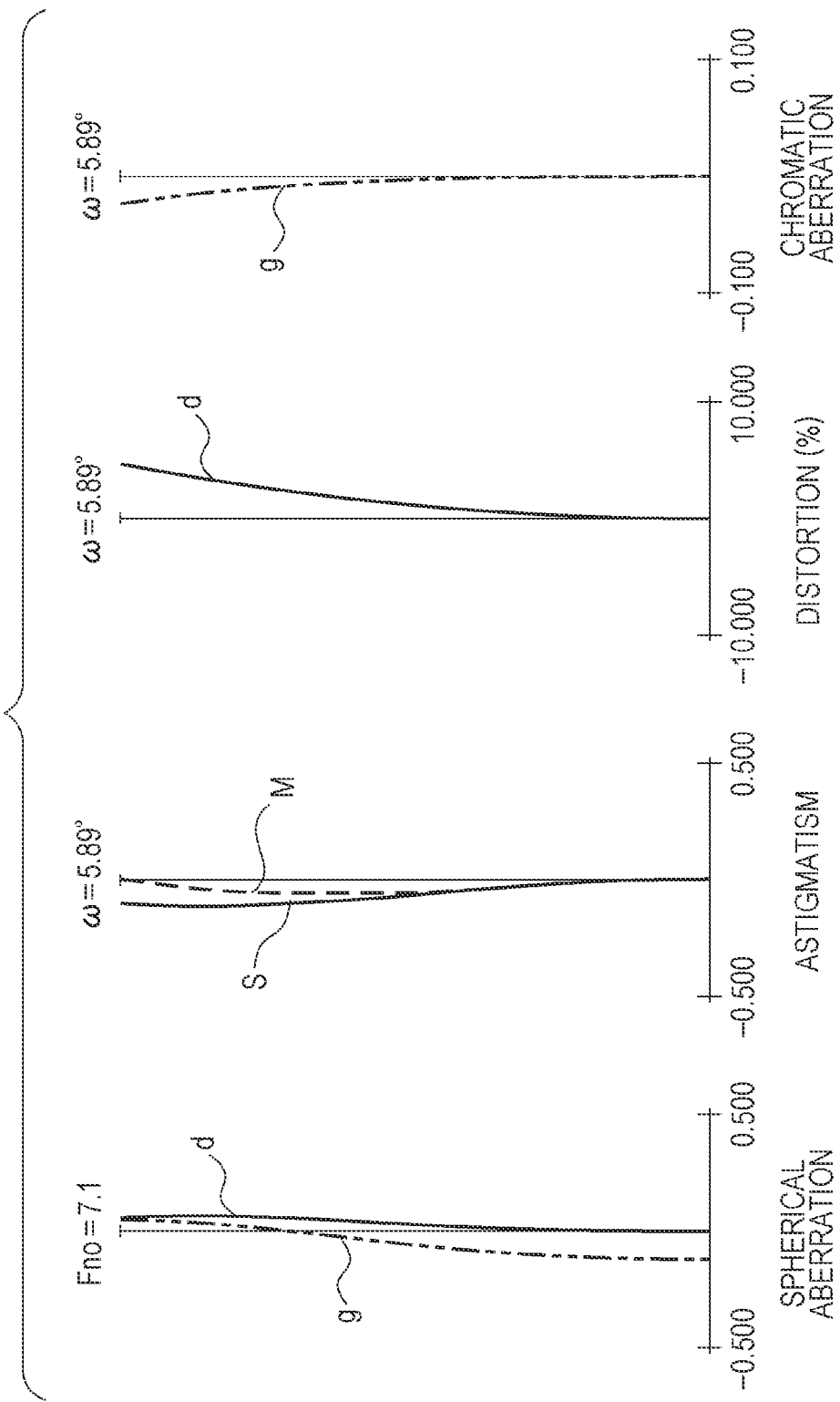

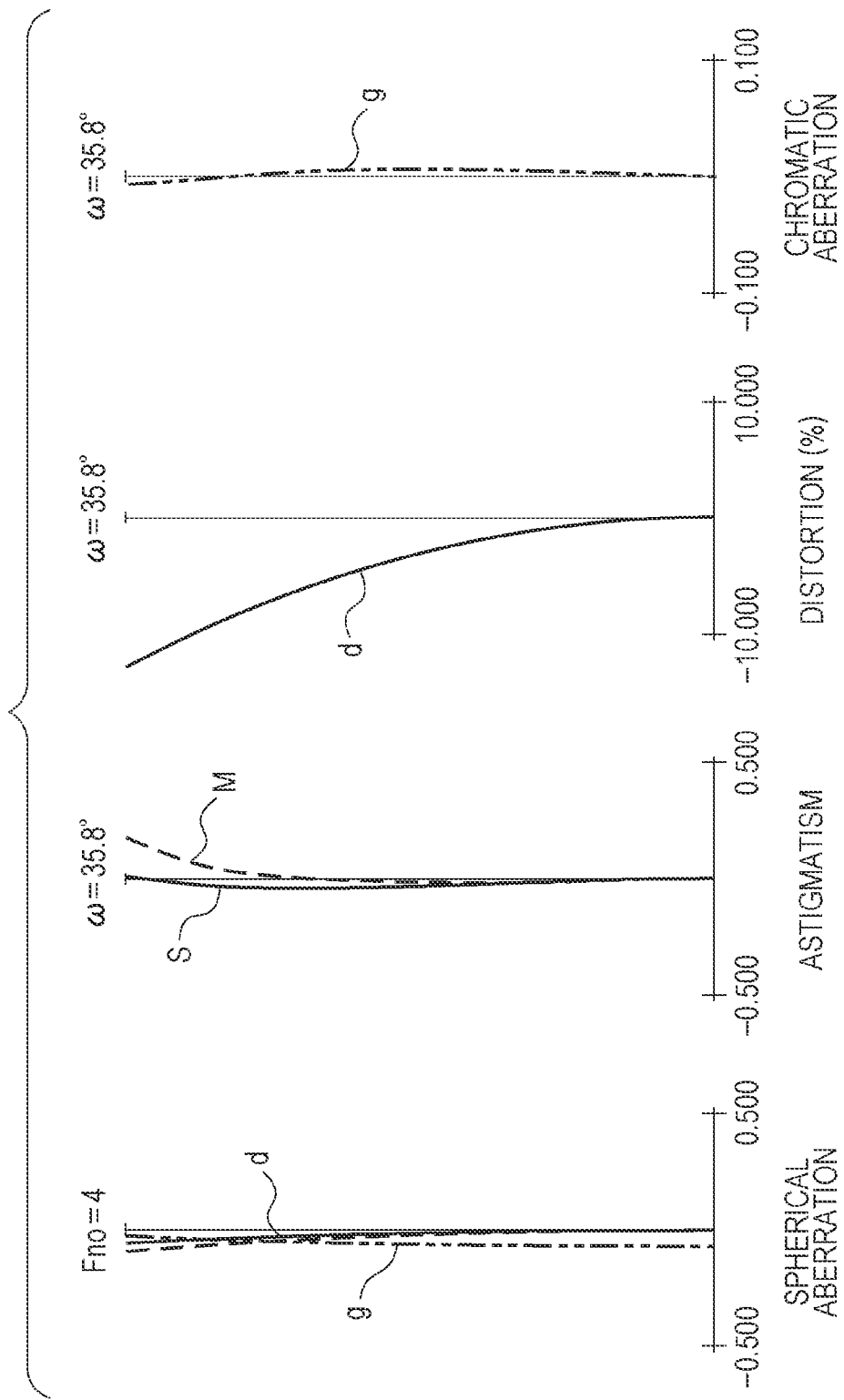

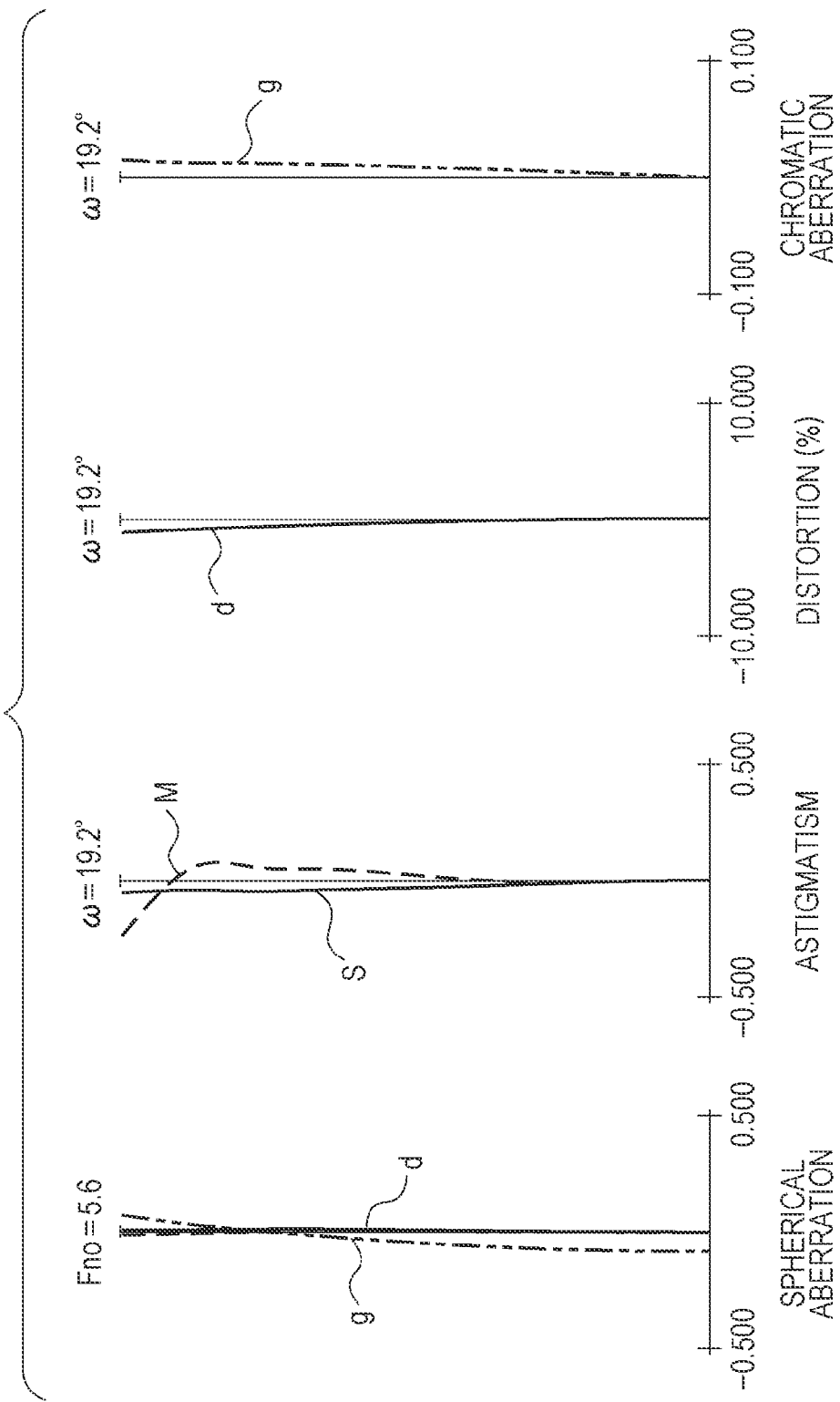

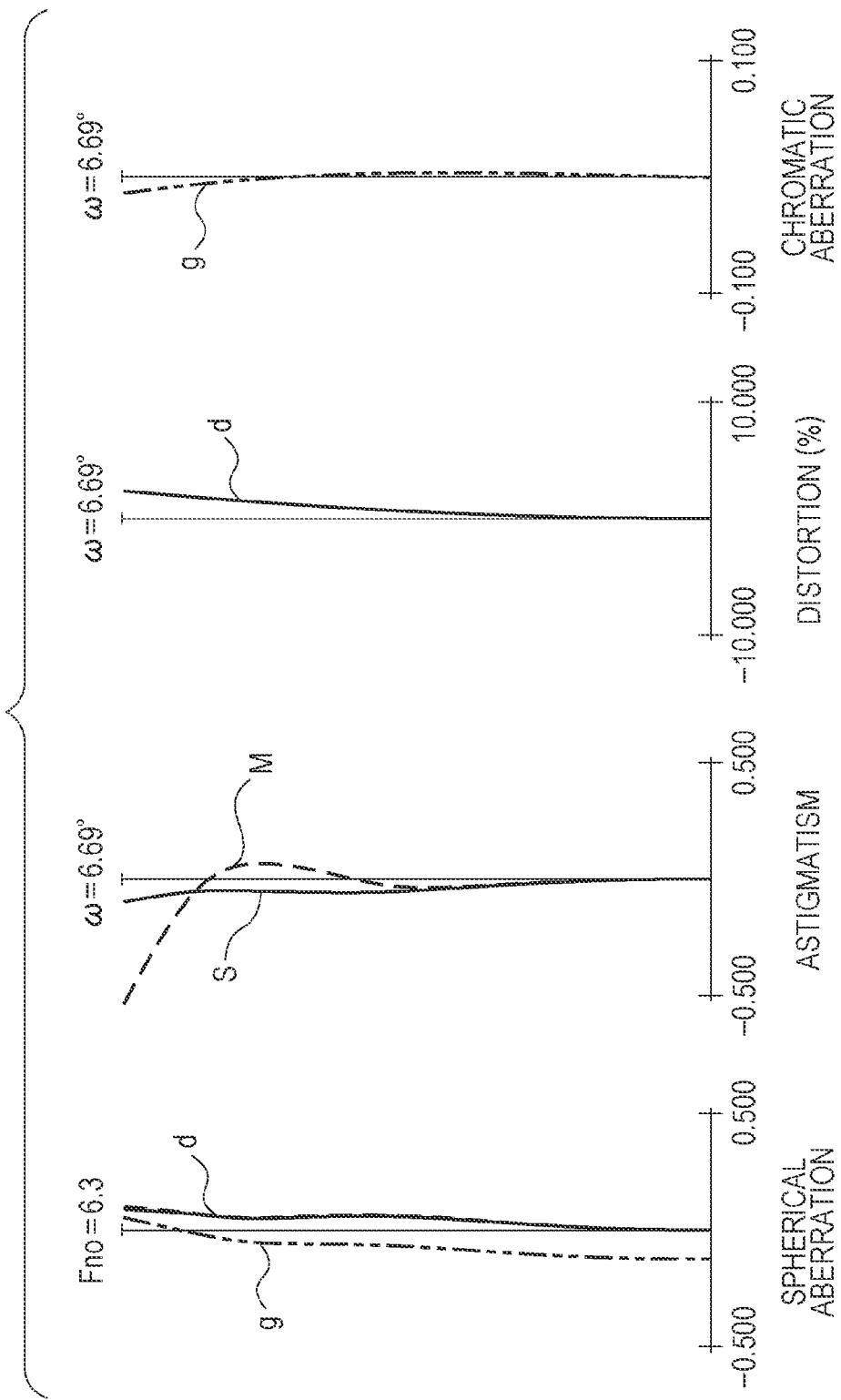

ZOOM LENS AND IMAGE CAPTURING APPARATUS

CROSS-REFERENCE TO RELATED APPLICATION

This application is a Continuation of U.S. application Ser. No. 16/682,602, filed Nov. 13, 2019, which claims priority from Japanese Patent Application No. 2018-224123, filed Nov. 29, 2018, which are hereby incorporated by reference herein in their entireties.

BACKGROUND OF THE INVENTION

Field of the Invention

The aspect of the embodiments relates to a zoom lens and an image capturing apparatus.

Description of the Related Art

There is a need for a zoom lens that is compact and has high optical performance over the entire zoom range. Therefore, zoom lenses that allow generation of barrel-shaped distortion aberration at the wide-angle end on the premise that distortion aberration is corrected by image processing after image capturing are known.

For example, Japanese Patent Laid-Open No. 2017-68155 discloses a high-power zoom lens that includes a first lens unit having a positive refractive power, a second lens unit having a negative refractive power, and a third lens unit having a positive refractive power, a fourth lens unit having a negative refractive power, and a fifth lens unit having a positive refractive power, which are arranged in order from the object side to the image side, and that allows distortion aberration.

In order to shorten the overall lens length of a zoom lens while maintaining the high optical performance over the entire zoom range, the relationship between the refractive powers of a plurality of lens units arranged on the image side with respect to the diaphragm is appropriately set.

SUMMARY OF THE INVENTION

A zoom lens includes: a first lens unit having a positive refractive power; a second lens unit having a negative refractive power; and a third lens unit having a positive refractive power, the lens units being arranged in order from an object side to an image side, and further comprising: an N−1th lens unit located second from the image side; and an Nth lens unit located closest to the image side, a distance between adjacent ones of the lens units changing during zooming, wherein the N−1th lens unit and the Nth lens unit are located on the image side with respect to an aperture stop, wherein at least one of the N−1th lens unit and the Nth lens unit has a negative refractive power, wherein, in a case where the N−1th lens unit and the Nth lens unit have a negative refractive power, the N−1th lens unit is referred to as an image-side negative lens unit, and in a case where only one of the N−1th lens unit and the Nth lens unit has a negative refractive power, the lens unit having a negative refractive power is referred to as an image-side negative lens unit, a combined refractive power of lenses from a lens unit having the aperture stop to the lens unit located adjacent to the object side of the image-side lens unit at a wide-angle end when focusing on an object at infinity is a positive refractive power, and a combined refractive power of lenses from the image-side lens unit to the image side at the wide-angle end when focusing on an object at infinity is a negative refractive power, and wherein the following inequalities are satisfied:

$0.40 < fw/skw < 2.90$ $-8.50 < f1/f2 < -5.90$, $1.07 < |(Rg2r1+Rg2r2)/(Rg2r1-Rg2r2)|$ $-1.27 < fn/fp < -0.70$ where fw is a focal length of the zoom lens at the wide-angle end when focusing on an object at infinity, skw is a back focus at the wide-angle end when focusing on an object at infinity, f1 is a focal length of the first lens unit, f2 is a focal length of the second lens unit, Rg2r1 is a curvature radius of a surface at a most object side of the second lens unit, Rg2r2 is a curvature radius of a surface at a most image side of the second lens unit, fp is a combined focal length of the lenses from the lens unit having the aperture stop to the lens unit located adjacent to the object side of the image-side lens unit at the wide-angle end when focusing on an object at infinity, and fn is a combined focal length of the lenses from the image-side lens unit to the image side at the wide-angle end when focusing on an object at infinity.

Further features of the disclosure will become apparent from the following description of exemplary embodiments (with reference to the attached drawings).

BRIEF DESCRIPTION OF THE DRAWINGS

FIG. 1 is a cross-sectional view of a zoom lens of a first exemplary embodiment.

FIGS. 2A to 2C are aberration diagrams of the zoom lens of first exemplary embodiment.

FIGS. 4A to 4C are aberration diagrams of the zoom lens of the second exemplary embodiment.

FIGS. 6A to 6C are aberration diagrams of the zoom lens of the third exemplary embodiment.

FIG. 7 is a cross-sectional view of a zoom lens of a fourth exemplary embodiment.

FIGS. 8A to 8C are aberration diagrams of the zoom lens of the fourth exemplary embodiment.

FIGS. 10A to 10C are aberration diagrams of the zoom lens of the fifth exemplary embodiment.

FIGS. 14A to 14C are aberration diagrams of the zoom lens of the seventh exemplary embodiment.

DESCRIPTION OF THE EMBODIMENTS

Figure 3:
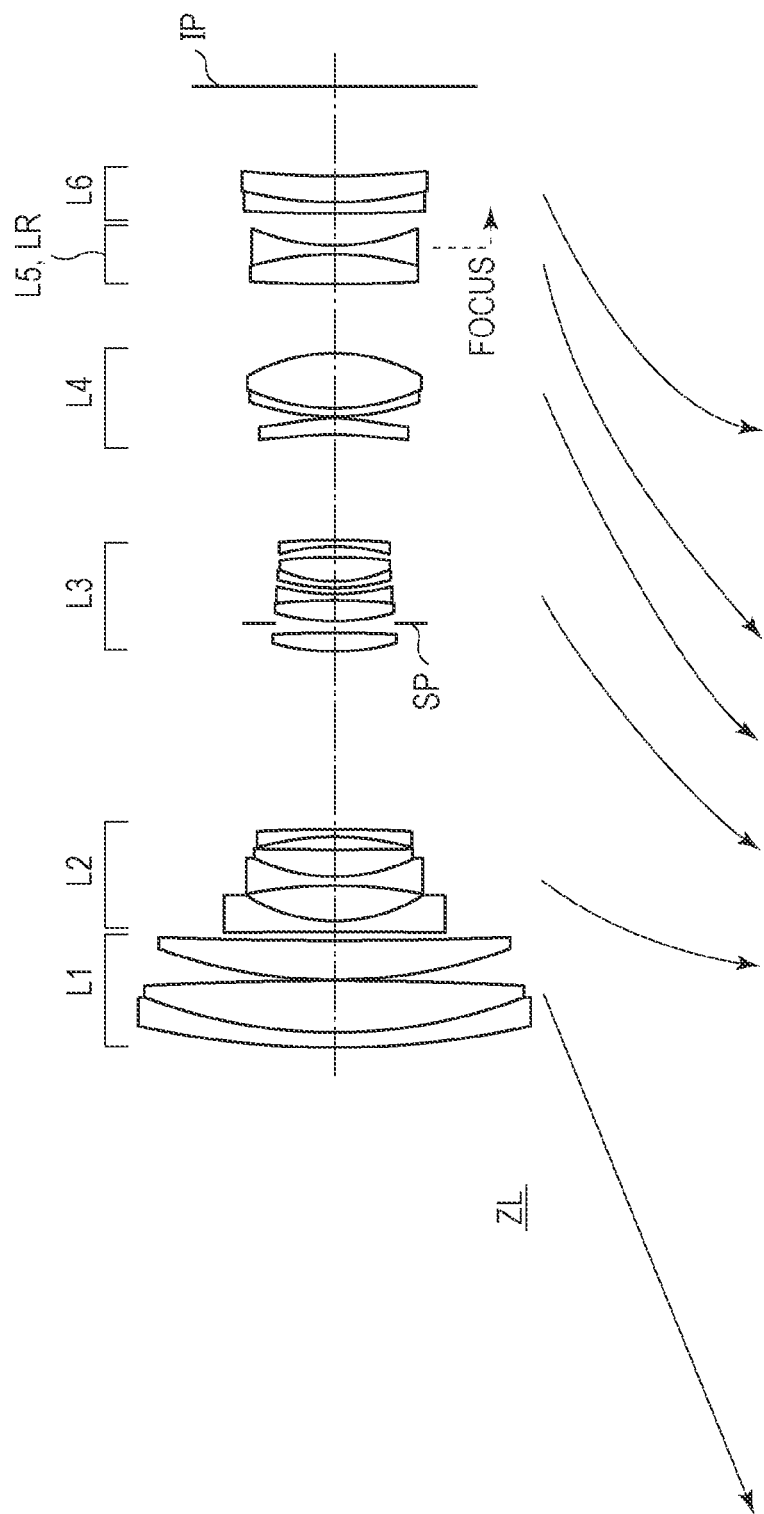
FIG. 3 is a cross-sectional view of a zoom lens of a second exemplary embodiment.

Hereinafter, zoom lenses and image capturing apparatuses according to exemplary embodiments of the disclosure will be described in detail with reference to the accompanying drawings.

Embodiments of Zoom Lens

The zoom lens of each exemplary embodiment is an image capturing zoom lens used in an image capturing apparatus such as a digital still camera, a broadcast camera, a silver-halide film camera, and a monitoring camera.

In cross-sectional views of zoom lenses illustrated in FIGS. 1, 3, 5, 7, 9, 11, and 13, the left side is the object side (front), and the right side is the image side (rear). In each cross-sectional view, Li represents the i-th lens unit where i is the order of the lens unit from the object side to the image side. An aperture stop SP determines (restricts) a beam of the open F-number (Fno). In focusing from an object at infinity to an object at the shortest distance, the focus lens units move as indicated by arrows in the drawings.

When the zoom lens of each exemplary embodiment is used in a digital still camera, a broadcast camera, or the like, the image plane IP corresponds to an imaging plane of an image sensor (photoelectric conversion element) such as a Charge Coupled Device (CCD) sensor or a Complementary Metal Oxide Semiconductor (CMOS) sensor. When the zoom lens of each exemplary embodiment is used in a silver-halide film camera, the image plane IP corresponds to a film plane.

FIGS. 2A to 2C, 4A to 4C, 6A to 6C, 8A to 8C, 10A to 10C, 12A to 12C, and 14A to 14C are aberration diagrams of the zoom lenses of exemplary embodiments. In the spherical aberration diagram, Fno indicates the F-number. In the spherical aberration diagram, the solid line is the d line (wavelength 587.6 nm), and the two-dot chain line is the g line (wavelength 435.8 nm). In the astigmatism diagram, the broken line M is the meridional image plane, and the solid line S is the sagittal image plane. The distortion aberration is illustrated with respect to the d line. The chromatic aberration of magnification is illustrated with respect to the g line. The sign ω indicates a half angle of field (degree).

In this specification, the term "lens unit" may include a plurality of lenses or may include one lens. The term "back focus" is the distance on the optical axis from the rearmost plane to the paraxial image plane of the zoom lens, expressed as an air conversion length. The term "overall lens length" is the distance obtained by adding the back focus to the distance on the optical axis from the forefront plane to the rearmost plane of the zoom lens. The Abbe number vd of a material is expressed as vd=(Nd−1)/(NF−NC) where Ng, NF, Nd, and NC are the refractive indexes of the material with respect to the g line (wavelength 435.8 nm), the F line (486.1 nm), the d line (587.6 nm), and the C line (656.3 nm) respectively. The "wide-angle end" is the zooming position when the focal length of the zoom lens is the shortest, and the "telephoto end" is the zooming position when the focal length of the zoom lens is the longest.

A zoom lens according to an exemplary embodiment of the disclosure includes a plurality of lens units in which the distance between adjacent lens units changes during zooming. The plurality of lens units includes a first lens unit having a positive refractive power, a second lens unit having a negative refractive power, and a third lens unit having a positive refractive power arranged in order from the object side to the image side, and an N−1th lens unit located second from the image side, and an Nth lens unit located closest to the image side.

The N−1th lens unit and the Nth lens unit are located on the image side with respect to the aperture stop, and at least one of the N−1th lens unit and the Nth lens unit has a negative refractive power. Further, when the N−1th lens unit and the Nth lens unit have a negative refractive power, the N−1th lens unit is referred to as an image-side negative lens unit, and when only one of the N−1th lens unit and the Nth lens unit has a negative refractive power, the lens unit having a negative refractive power is referred to as an image-side negative lens unit.

Further, the combined refractive power of lenses from the lens unit having the aperture stop to the lens unit located adjacent to the object side of the image-side lens unit at the wide-angle end when focusing on an object at infinity is a positive refractive power. The combined refractive power of lenses from the image-side lens unit to the image side at the wide-angle end when focusing on an object at infinity is a negative refractive power.

By configuring the first lens unit, the second lens unit, and the third lens unit as described above, a zoom lens having a relatively large zoom ratio can be obtained.

By making the lens units closer to the image side than the aperture stop have positive and negative refractive powers in order toward the image side, the optical arrangement is of a telephoto type. With such a configuration, the overall lens length of the zoom lens can be shortened.

Further, the zoom lens according to the exemplary embodiment of the disclosure is configured to satisfy the following inequalities (conditional expressions) (1) to (4).

$$0.40 < fw/skw < 2.90 \quad (1)$$

$$-8.50 < f1/f2 < -5.90 \quad (2)$$

$$1.07 < |(Rg2r1+Rg2r2)/(Rg2r1-Rg2r2)| \quad (3)$$

$$-1.27 < fn/fp < -0.70 \quad (4)$$

In the inequalities, fw is the focal length of the zoom lens at the wide-angle end when focusing on an object at infinity, skw is the back focus at the wide-angle end when focusing on an object at infinity, f1 is the focal length of the first lens unit, and f2 is the focal length of the second lens unit. Rg2r1 is the curvature radius of the surface at the most object side of the second lens unit, and Rg2r2 is the curvature radius of the surface at the most image side of the second lens unit. fp is the combined focal length of lenses from the lens unit having the aperture stop to the lens unit located adjacent to the object side of the image-side lens unit at the wide-angle end when focusing on an object at infinity, and fn is the combined focal length of lenses from the image-side lens unit to the image side at the wide-angle end when focusing on an object at infinity. When there is no other lens unit on the image side of the image-side lens unit, fn is the focal length of the image-side lens unit.

The inequality (1) defines the ratio of the focal length of the zoom lens at the wide-angle end when focusing on an object at infinity to the back focus when focusing on an object at infinity. When the back focus becomes longer to make the value defined by inequality (1) smaller than the lower limit value of the inequality, the overall lens length increases and the zoom lens becomes larger, which may not be preferable. When the back focus becomes shorter to make the value defined by inequality (1) larger than the upper limit value of the inequality, the incident angle of off-axis rays on the image plane increases. As a result, so-called shading such as light falloff or coloring at the peripheral image height due to the image sensor occurs, which may not be preferable.

The inequality (2) defines the ratio between the focal lengths of the first lens unit and the second lens unit of the zoom lens. When the focal length of the first lens unit becomes longer to make the value defined by inequality (2)

smaller than the lower limit value of the inequality, the refractive power of the first lens unit becomes too low, resulting in a longer overall lens length, making it difficult to reduce the size of the zoom lens, which may not be preferable. When the focal length of the first lens unit becomes shorter to make the value defined by inequality (2) larger than the upper limit of the inequality, the refractive power of the first lens unit becomes high, and aberration fluctuations of the spherical aberration, the curvature of field, and the like during zooming becomes larger, which may not be preferable.

The inequality (3) relates to the shape factor of the most object-side surface and the image-side surface of the second lens unit. When the image side with respect to the aperture stop has a telephoto type refracting power configuration, the maximum incident angle of the off-axis beam with respect to the image plane is likely to be large, shading is likely to occur, and coloring and illuminance deterioration are likely to occur around the image. Therefore, this condition is defined in order to reduce the incident angle of the off-axis rays to the sensor by reducing the image circle diameter. When the value defined by inequality (3) is lower than the lower limit value of the inequality, barrel-shaped distortion aberration in the second lens unit is reduced, and it will be difficult to reduce the image circle diameter at the wide-angle end. Thus, the diameter of each lens included in the zoom lens becomes lager, making it difficult to reduce the size of the zoom lens, which may not be preferable. Furthermore, coma aberration due to the second lens unit occurs at the telephoto end, which may not be preferable.

The inequality (4) defines the relationship of the refractive power of a part on the image side with respect to the aperture stop. If the combined focal length from the image-side lens unit to the image side becomes longer to make the value defined by inequality (4) lower than the lower limit value of the inequality (the absolute value of the negative combined focal length becomes larger), so that the negative combined refractive power becomes lower, it is difficult to obtain the telephoto type refractive power balance. This may not be preferable because the zoom lens becomes large. If the combined focal length from the image-side lens unit to the image side becomes shorter to make the value defined by inequality (4) higher than the upper limit of inequality (4) (the absolute value of the negative combined focal length becomes smaller), so that the negative combined refractive power becomes higher, the force that largely bends the off-axis beam is increased, and thus the maximum incident angle with respect to the image plane is increased. This causes shading, and thus may not be preferable.

In one embodiment, the numerical ranges of inequalities (1) to (4) set as follows.

$$0.60 < fw/skw < 2.70 \tag{1a}$$

$$-8.30 < f1/f2 < -5.93 \tag{2a}$$

$$1.08 < |(Rg2r1+Rg2r2)/(Rg2r1-Rg2r2)| \tag{3a}$$

$$-1.266 < fn/fp < -0.72 \tag{4a}$$

In another embodiment, the numerical ranges of inequalities (1) to (4) be set as follows.

$$0.75 < fw/skw < 2.50 \tag{1b}$$

$$-8.10 < f1/f2 < -5.95 \tag{2b}$$

$$1.09 < |(Rg2r1+Rg2r2)/(Rg2r1-Rg2r2)| \tag{3b}$$

$$-1.265 < fn/fp < -0.74 \tag{4b}$$

Furthermore, the zoom lens according to the exemplary embodiment satisfy one or more of the following inequalities (5) to (7). Accordingly, at least one of the effects of size reduction of a zoom lens and high optical performance over the entire zoom range can be obtained.

$$0.80 < |(Rg1r1+Rg1r2)/(Rg1r1-Rg1r2)| \tag{5}$$

$$2.70 < f1/skw < 25.00 \tag{6}$$

$$-3.00 < f2/skw < -0.35 \tag{7}$$

In the inequalities, Rg1r1 is the curvature radius of the surface at the most object side of the first lens unit, and Rg1r2 is the curvature radius of the surface at the most image side of the first lens unit.

The inequality (5) defines the shape factor of the most object-side surface and the most image-side surface of the first lens unit. The inequality (5) indicates that the difference between shapes of the most object-side surface and the most image-side surface of the first lens unit is relatively small. When the difference in the curvature radius between the most object-side surface of the first lens unit and the most image-side surface of the first lens unit becomes large to make the value defined by inequality (5) lower than the lower limit value of the inequality, the cancellation relationship between the spherical aberrations deteriorates. Therefore, the configuration may not be preferable.

The inequality (6) defines the ratio of the focal length to the back focus at the wide-angle end when focusing on an object at infinity of the first lens unit. When the focal length of the first lens unit becomes shorter to make the value defined by inequality (6) lower than the lower limit value of the inequality and the refractive power of the first lens unit becomes higher, various aberrations such as spherical aberration that occur in the first lens unit become larger, which may not be preferable. When the focal length of the first lens unit becomes longer to make the value defined by inequality (6) larger than the upper limit of the inequality, the refractive power of the first lens unit becomes low, resulting in a longer overall lens length, making it difficult to reduce the size of the zoom lens, which may not be preferable.

The inequality (7) defines the ratio of the focal length to the back focus at the wide-angle end when focusing on an object at infinity of the second lens unit. When the focal length of the second lens unit becomes longer (the absolute value of the focal length becomes larger) to make the value defined by inequality (7) smaller than the lower limit value of the inequality, the refractive power of the second lens unit becomes low, resulting in a larger moving amount of the second lens unit during zooming, making it difficult to reduce the size of the zoom lens, which may not be preferable. When the focal length of the second lens unit becomes shorter (the absolute value of the focal length becomes smaller) to make the value defined by inequality (7) larger than the upper limit of the inequality, the refractive power of the second lens unit becomes high, and aberration fluctuations of the curvature of field and the like during zooming becomes larger, which may not be preferable.

In one embodiment, the numerical ranges of inequalities (5) to (7) are set as follows.

$$1.00 < |(Rg1r1+Rg1r2)/(Rg1r1-Rg1r2)| \tag{5a}$$

$$3.00 < f1/skw < 15.00 \tag{6a}$$

$$-2.50 < f2/skw < -0.45 \tag{7a}$$

In another embodiment, the numerical ranges of inequalities (5) to (7) are set as follows.

$$1.10 < |(Rg1r1+Rg1r2)/(Rg1r1-Rg1r2)| \quad (5b)$$

$$3.30 < f1/skw < 12.00 \quad (6b)$$

$$-2.20 < f2/skw < -0.53 \quad (7b)$$

In one embodiment, at least one of all lenses included in the second lens unit and all lenses located on the object side with respect to the aperture stop be spherical lenses. With this configuration, a high correction effect can be obtained for various aberrations other than distortion aberration. This is beneficial especially when distortion aberration is electronically corrected on the image capturing apparatus side because an image with less aberration can be obtained. Moreover, the cost of the zoom lens can be reduced by using only spherical lenses.

In another embodiment, the image-side lens unit include a positive lens. By locating a positive lens in the image-side lens unit having a negative refractive power, it becomes easy to correct chromatic aberration of magnification.

When the image-side lens unit is the N−1th lens unit, at least one of the N−1th lens unit and the Nth lens unit move during focusing. When the image-side lens unit is the Nth lens unit, in one embodiment, the Nth lens unit move during focusing. By locating a lens that moves, during focusing, to a position where the height of the peripheral ray of the on-axial beam is relatively low, it is possible to suppress aberration fluctuation caused by focusing. With this configuration, high optical performance can be obtained when focusing from infinity to the closest distance.

In yet another embodiment, the N−1th lens unit and the Nth lens unit are formed from a cemented lens. By forming a lens unit located on the side relatively close to the image plane such that the interface between the lens and air is small, ghost caused by light reflected to the object side by the image sensor located on the image plane and the like can be reduced.

Further, the higher the maximum height of the off-axis beam from the optical axis, the higher the effect of chromatic aberration of magnification. Therefore, the correction effect of the chromatic aberration of magnification is enhanced by locating a lens unit including a positive lens and a negative lens at a position close to the image plane where the height of the off-axis ray is high. The number of positive lenses and negative lenses included in the cemented lens is not limited to one, and at least one of them may be plural.

First Exemplary Embodiment

FIG. 1 is a cross-sectional view of a zoom lens ZL of the first exemplary embodiment at the wide-angle end when focusing on an object at infinity. FIGS. 2A to 2C are aberration diagrams of the zoom lens ZL of the first exemplary embodiment when focusing on an object at infinity. FIG. 2A illustrates the aberration at the wide-angle end, FIG. 2B illustrates the aberration at the intermediate zooming position, and FIG. 2C illustrates the aberration at the telephoto end.

A plurality of lens units included in the zoom lens of first exemplary embodiment includes a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a negative refractive power.

The fifth lens unit L5 corresponds to the above-described N−1th lens unit, and the sixth lens unit L6 corresponds to the above-described Nth lens unit. In the present exemplary embodiment, the above-described image-side lens unit LR is the fifth lens unit L5. The third lens unit L3 has an aperture stop SP. Therefore, regarding the parameters of inequality (4), the combined focal length of the third lens unit L3 and the fourth lens unit L4 corresponds to fp, and the combined focal length of the fifth lens unit L5 and the sixth lens unit L6 corresponds to fn.

In the zoom lens ZL, each lens unit moves during zooming, so that the distance between adjacent lens units changes. In zooming, the fourth lens unit L4 and the sixth lens unit L6 move (integrally) along the same locus. Thereby, the cam mechanism for driving can be simplified.

During focusing from an object at infinity to an object at the shortest distance, the fifth lens unit L5 moves to the image side. The other lens units do not move during focusing.

Second Exemplary Embodiment

FIG. 3 is a cross-sectional view of a zoom lens ZL of a second exemplary embodiment at the wide-angle end when focusing on an object at infinity. FIGS. 4A to 4C are aberration diagrams of the zoom lens ZL of the second exemplary embodiment when focusing on an object at infinity. FIG. 4A illustrates the aberration at the wide-angle end, FIG. 4B illustrates the aberration at the intermediate zooming position, and FIG. 4C illustrates the aberration at the telephoto end.

A plurality of lens units included in the zoom lens of second exemplary embodiment includes a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power.

The fifth lens unit L5 corresponds to the above-described N−1th lens unit, and the sixth lens unit L6 corresponds to the above-described Nth lens unit. In the present exemplary embodiment, the above-described image-side lens unit LR is the fifth lens unit L5. The third lens unit L3 has an aperture stop SP. Therefore, regarding the parameters of inequality (4), the combined focal length of the third lens unit L3 and the fourth lens unit L4 corresponds to fp, and the combined focal length of the fifth lens unit L5 and the sixth lens unit L6 corresponds to fn.

In the zoom lens ZL, each lens unit moves during zooming, and the distance between adjacent lens units changes. In zooming, the lens units move along different loci from each other.

During focusing from an object at infinity to an object at the shortest distance, the fifth lens unit L5 moves to the image side. The other lens units do not move during focusing.

Third Exemplary Embodiment

Figure 5:
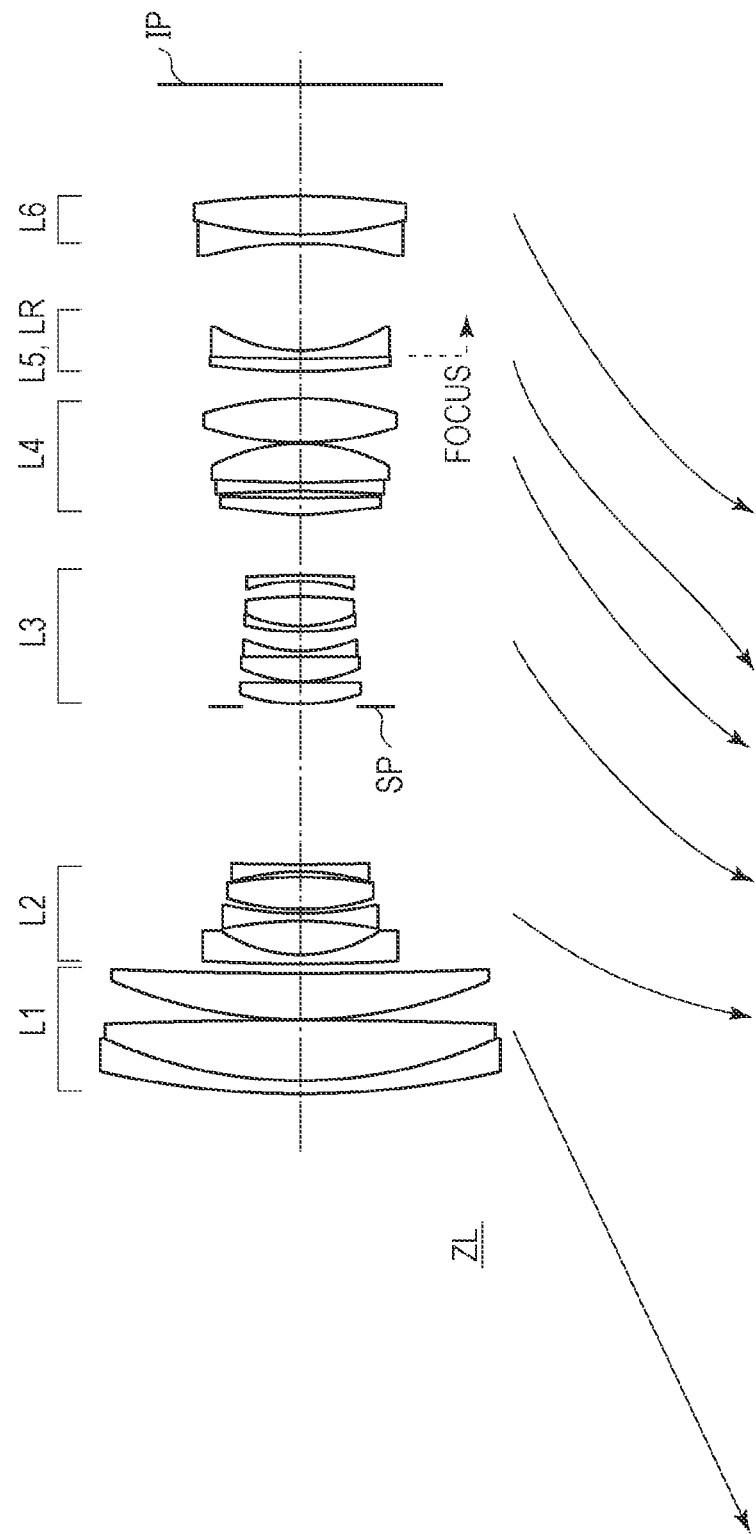
FIG. 5 is a cross-sectional view of a zoom lens of a third exemplary embodiment.

FIG. 5 is a cross-sectional view of a zoom lens ZL of a third exemplary embodiment at the wide-angle end when focusing on an object at infinity. FIGS. 6A to 6C are aberration diagrams of the zoom lens ZL of the third exemplary embodiment when focusing on an object at infinity. FIG. 6A illustrates the aberration at the wide-angle end, FIG. 6B illustrates the aberration at the intermediate zooming position, and FIG. 6C illustrates the aberration at the telephoto end.

In the zoom lens according to the third exemplary embodiment, the refractive power of each lens unit, the lens unit having the aperture stop SP, the lens unit that moves during focusing and its moving direction, and the correspondence relationship between the parameters of inequality (4) and the lens units are not described because they are similar to those of the zoom lens of the first exemplary embodiment.

Fourth Exemplary Embodiment

FIG. 7 is a cross-sectional view of a zoom lens ZL of a fourth exemplary embodiment at the wide-angle end when focusing on an object at infinity. FIGS. 8A to 8C are aberration diagrams of the zoom lens ZL of the fourth exemplary embodiment when focusing on an object at infinity. FIG. 8A illustrates the aberration at the wide-angle end, FIG. 8B illustrates the aberration at the intermediate zooming position, and FIG. 8C illustrates the aberration at the telephoto end.

In the zoom lens according to the fourth exemplary embodiment, the refractive power of each lens unit, the lens unit having the aperture stop SP, the lens unit that moves during focusing and its moving direction, and the correspondence relationship between the parameters of inequality (4) and the lens units are not described because they are similar to those of the zoom lens of the first exemplary embodiment.

Fifth Exemplary Embodiment

Figure 9:
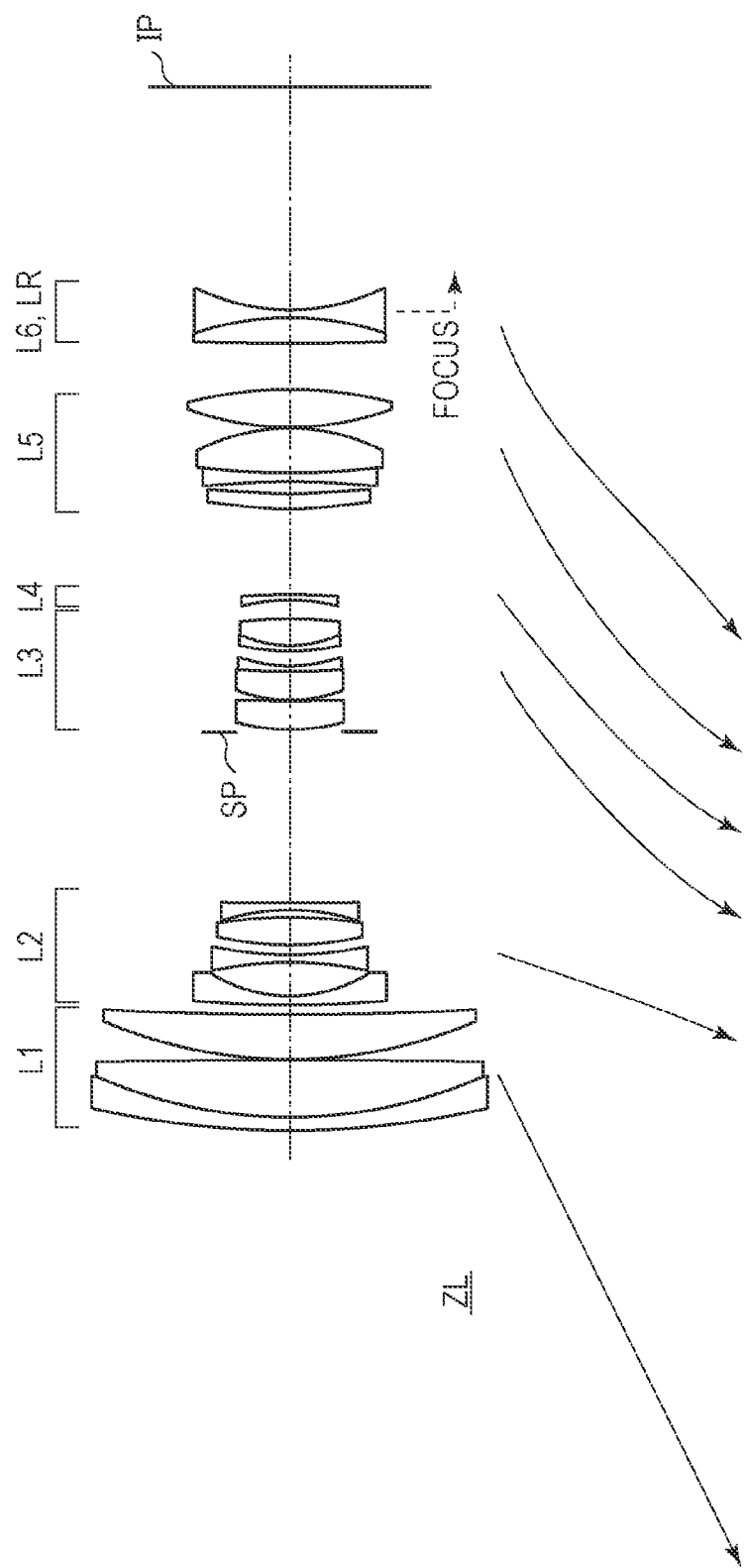
FIG. 9 is a cross-sectional view of a zoom lens of a fifth exemplary embodiment.

FIG. 9 is a cross-sectional view of a zoom lens ZL of a fifth exemplary embodiment at the wide-angle end when focusing on an object at infinity. FIGS. 10A to 10C are aberration diagrams of the zoom lens ZL of the fifth exemplary embodiment when focusing on an object at infinity. FIG. 10A illustrates the aberration at the wide-angle end, FIG. 10B illustrates the aberration at the intermediate zooming position, and FIG. 10C illustrates the aberration at the telephoto end.

A plurality of lens units included in the zoom lens of fifth exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a negative refractive power.

The fifth lens unit L5 corresponds to the above-described N−1th lens unit, and the sixth lens unit L6 corresponds to the above-described Nth lens unit. In the present exemplary embodiment, the above-described image-side lens unit LR is the sixth lens unit L6.

The third lens unit L3 has an aperture stop SP. Therefore, regarding the parameters of inequality (4), the combined focal length of the third lens unit L3, the fourth lens unit L4, and the fifth lens unit L5 corresponds to fp, and the focal length of the sixth lens unit L6 corresponds to fn.

In the zoom lens ZL, each lens unit moves during zooming, so that the distance between adjacent lens units changes. In zooming, the lens units move along different loci from each other.

During focusing from an object at infinity to an object at the shortest distance, the sixth lens unit L6 moves to the image side. The other lens units do not move during focusing.

Sixth Exemplary Embodiment

Figure 11:
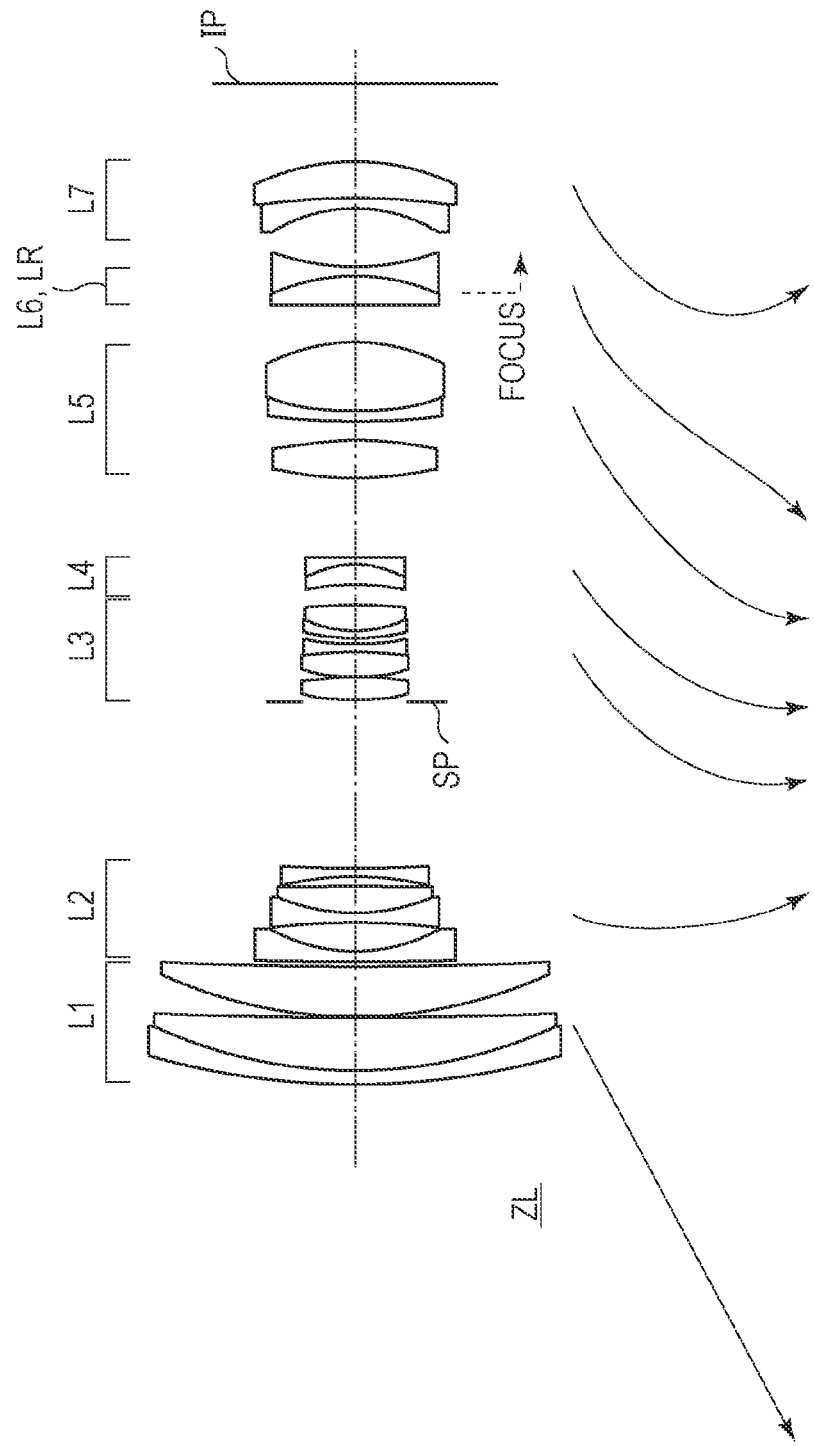
FIG. 11 is a cross-sectional view of a zoom lens of a sixth exemplary embodiment.
Figure 12A:
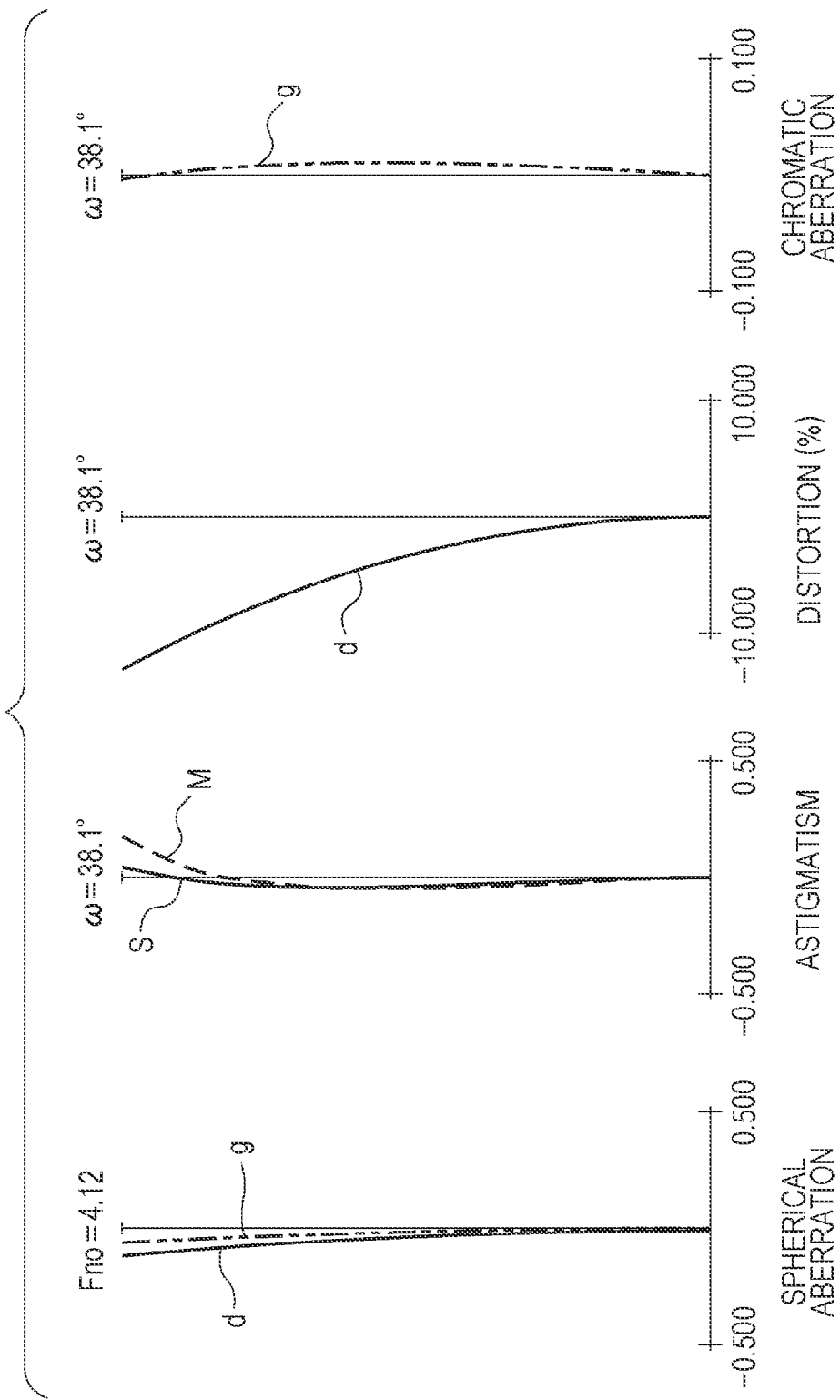
FIGS. 12A to 12C are aberration diagrams of the zoom lens of the sixth exemplary embodiment.
Figure 12B:
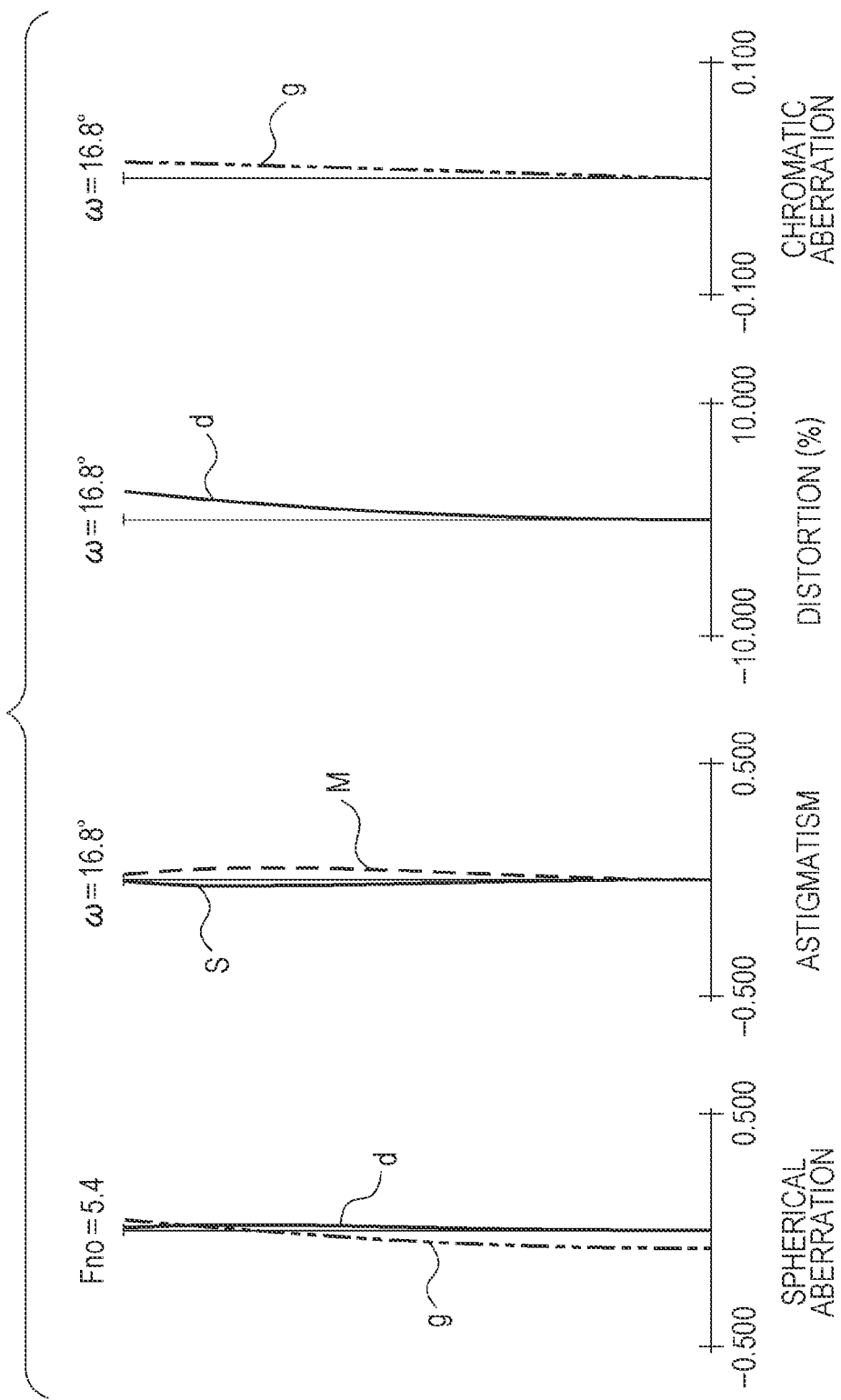
Figure 12C:
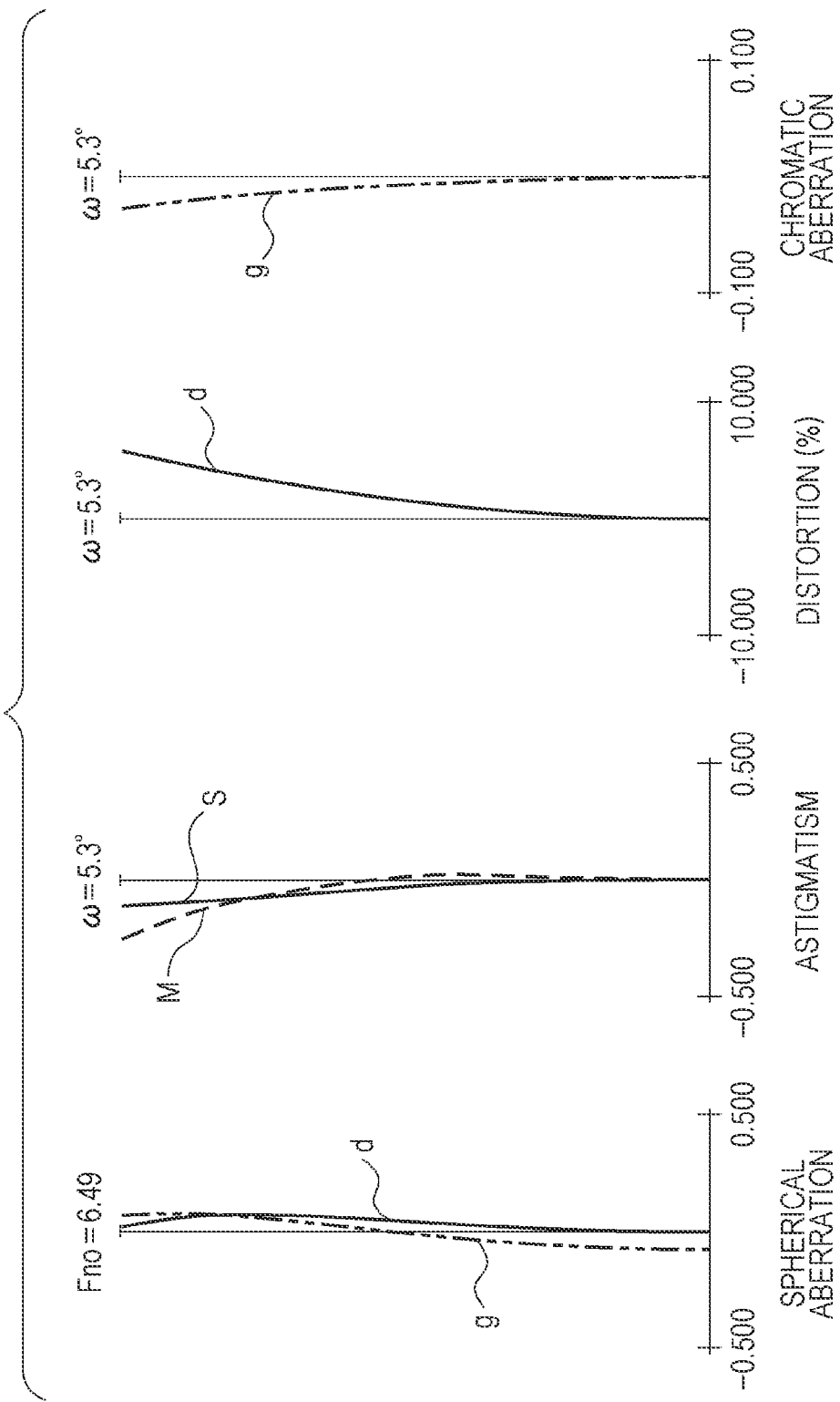

FIG. 11 is a cross-sectional view of a zoom lens ZL of a sixth exemplary embodiment at the wide-angle end when focusing on an object at infinity. FIGS. 12A to 12C are aberration diagrams of the zoom lens ZL of the sixth exemplary embodiment when focusing on an object at infinity. FIG. 12A illustrates the aberration at the wide-angle end, FIG. 12B illustrates the aberration at the intermediate zooming position, and FIG. 12C illustrates the aberration at the telephoto end.

A plurality of lens units included in the zoom lens of sixth exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power, and a seventh lens unit L7 having a negative refractive power.

The sixth lens unit L6 corresponds to the above-described N−1th lens unit, and the seventh lens unit L7 corresponds to the above-described Nth lens unit. In the present exemplary embodiment, the above-described image-side lens unit LR is the sixth lens unit L6. The third lens unit L3 has an aperture stop SP. Therefore, regarding the parameters of inequality (4), the combined focal length of the third lens unit L3, the fourth lens unit L4, and the fifth lens unit L5 corresponds to fp, and the combined focal length of the sixth lens unit L6 and the seventh lens unit L7 corresponds to fn. In the zoom lens ZL, each lens unit moves during zooming, so that the distance between adjacent lens units changes. In zooming, the lens units move along different loci from each other.

During focusing from an object at infinity to an object at the shortest distance, the fifth lens unit L5 moves to the image side. The other lens units do not move during focusing.

Seventh Exemplary Embodiment

Figure 13:
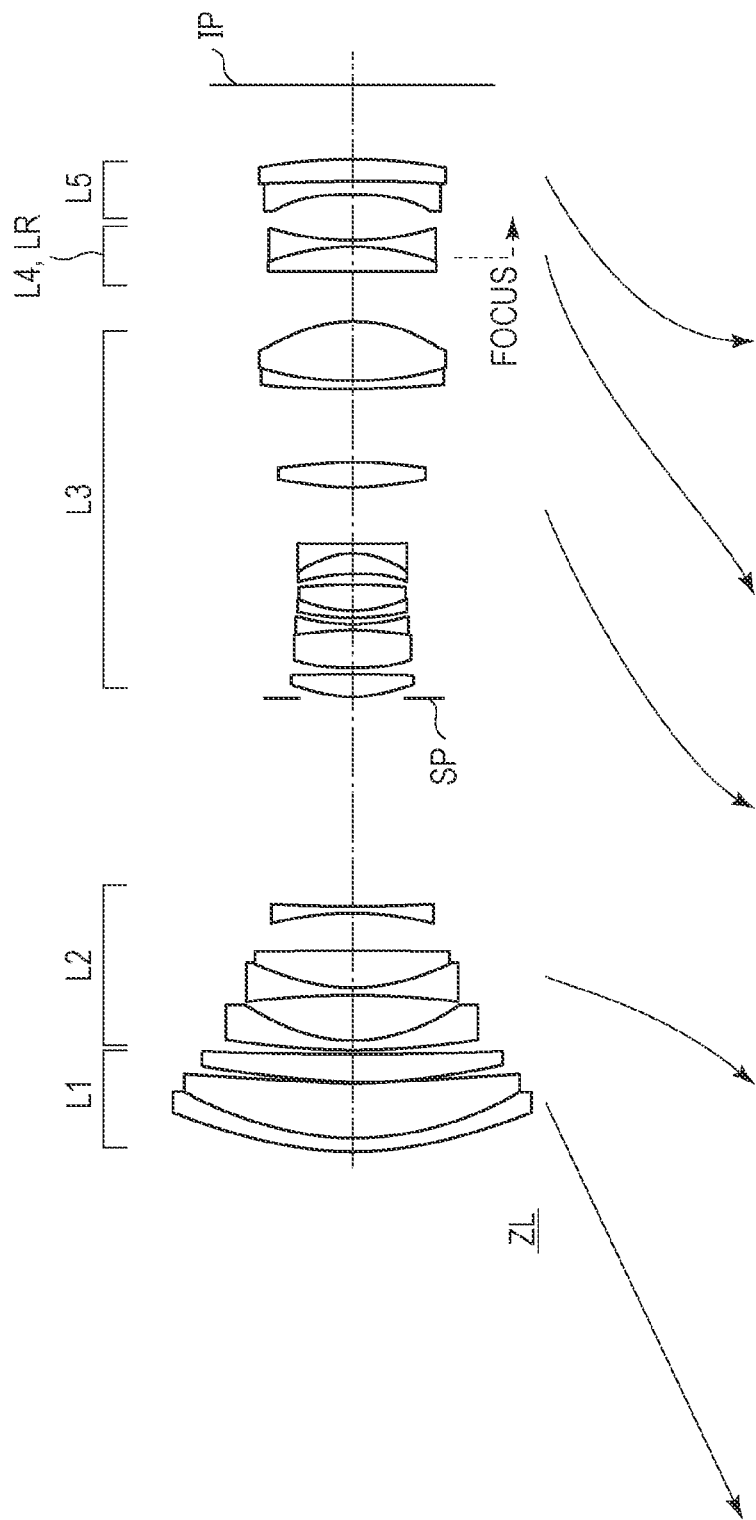
FIG. 13 is a cross-sectional view of a zoom lens of a seventh exemplary embodiment.

FIG. 13 is a cross-sectional view of a zoom lens ZL of a seventh exemplary embodiment at the wide-angle end when focusing on an object at infinity. FIGS. 14A to 14C are aberration diagrams of the zoom lens ZL of the seventh exemplary embodiment when focusing on an object at infinity. FIG. 14A illustrates the aberration at the wide-angle end, FIG. 14B illustrates the aberration at the intermediate zooming position, and FIG. 14C illustrates the aberration at the telephoto end.

A plurality of lens units included in the zoom lens of seventh exemplary embodiment includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a negative refractive power.

The fourth lens unit L4 corresponds to the above-described N−1th lens unit, and the fifth lens unit L5 corresponds to the above-described Nth lens unit. In the present exemplary embodiment, the above-described image-side lens unit LR is the fifth lens unit L5. The third lens unit L3 has an aperture stop SP. Therefore, regarding the parameters of inequality (4), the focal length of the third lens unit L3 corresponds to fp, and the combined focal length of the fourth lens unit L4 and the fifth lens unit L5 corresponds to fn.

In the zoom lens ZL, each lens unit moves during zooming, so that the distance between adjacent lens units changes. In zooming, the lens units move along different loci from each other.

During focusing from an object at infinity to an object at the shortest distance, the fourth lens unit L4 moves to the image side. The other lens units do not move during focusing.

In the zoom lenses according to the first to seventh exemplary embodiments, all lenses included in the first lens unit L1 and the second lens unit L2 are spherical lenses. The zoom lenses according to the first to seventh exemplary embodiments have a positive lens as the image-side lens unit LR or on the image side of the image-side lens unit LR.

Numerical Examples

The numerical examples 1 to 7 respectively corresponding to the first to seventh exemplary embodiments are described below. In the numerical examples 1 to 7, the surface number indicates the order of the optical surfaces from the object side. In the numerical examples, r indicates the curvature radius (mm) of the optical surface, d indicates the distance (mm) between adjacent optical surfaces, nd indicates the refractive index of the optical member material at the d line, and vd indicates the Abbe number of the optical member material when the d line is the reference. The definition of the Abbe number is as described above. In the numerical examples, BF indicates back focus.

The aspheric surface is marked with an asterisk (*) on the right side of the surface number in each numerical example. When the optical axis direction is indicated as the X axis, the direction perpendicular to the optical axis is indicated as the H axis, the light traveling direction is defined to be positive, R is the paraxial curvature radius, K is the conic constant, A4, A6, A8, A10, and A12 are aspheric surface coefficients, the aspherical shape is expressed as follows.

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}$$ [Equation 1]

In the equation, "e±x" in the aspherical coefficient means $10^{\pm x}$.

In Table 1, values corresponding to the inequalities (1) to (7) in each of the numerical examples 1 to 7 are listed.

Numerical Example 1

| | | unit mm | | | |
|---|---|---|---|---|---|
| | | Surface Data | | | |
| Surface Number | r | d | nd | vd | Effective Diameter |
| 1 | 112.147 | 2.40 | 1.90366 | 31.3 | 60.02 |
| 2 | 71.272 | 8.23 | 1.49700 | 81.5 | 58.49 |
| 3 | −7459.449 | 0.15 | | | 58.13 |
| 4 | 82.892 | 6.55 | 1.49700 | 81.5 | 56.63 |
| 5 | 1699.730 | (variable) | | | 55.86 |
| 6 | −25607.668 | 1.75 | 1.85150 | 40.8 | 33.35 |
| 7 | 24.930 | 4.73 | | | 26.99 |
| 8 | −161.592 | 1.40 | 1.53775 | 74.7 | 26.79 |
| 9 | 24.230 | 3.97 | 1.89286 | 20.4 | 24.10 |
| 10 | 99.056 | 2.16 | | | 23.19 |
| 11 | −53.039 | 1.20 | 1.76385 | 48.5 | 22.96 |
| 12 | −1213.107 | (variable) | | | 22.21 |
| 13 (Aperture) | ∞ | 0.40 | | | 18.09 |
| 14 | 32.991 | 3.12 | 1.57501 | 41.5 | 18.74 |
| 15 | −122.831 | 0.20 | | | 18.75 |
| 16 | 36.540 | 3.60 | 1.61293 | 37.0 | 18.62 |
| 17 | −48.962 | 1.00 | 1.95375 | 32.3 | 18.24 |
| 18 | 45.085 | 1.09 | | | 17.88 |
| 19 | 49.738 | 1.00 | 1.95375 | 32.3 | 18.01 |
| 20 | 22.552 | 3.80 | 1.71999 | 50.2 | 17.78 |
| 21 | −82.995 | 2.11 | | | 17.75 |
| 22 | −25.563 | 2.91 | 1.95375 | 32.3 | 17.56 |
| 23 | −14.773 | 1.00 | 1.83400 | 37.2 | 17.94 |
| 24 | −118.315 | (variable) | | | 18.61 |
| 25* | 60.756 | 4.29 | 1.58313 | 59.4 | 23.59 |
| 26* | −39.177 | 1.52 | | | 23.95 |
| 27 | 29373.826 | 1.30 | 1.85478 | 24.8 | 24.93 |
| 28 | 74.143 | 9.06 | 1.49700 | 81.5 | 25.40 |
| 29 | −26.280 | (variable) | | | 26.82 |
| 30 | 77.159 | 2.67 | 2.00069 | 25.5 | 25.50 |
| 31 | −495.414 | 1.35 | 1.89190 | 37.1 | 25.21 |
| 32 | 29.373 | (variable) | | | 24.29 |
| 33 | −35.391 | 1.50 | 1.89190 | 37.1 | 25.90 |
| 34 | −357.011 | 0.15 | | | 28.05 |
| 35 | 229.921 | 3.11 | 1.89286 | 20.4 | 29.06 |
| 36 | −87.477 | (variable) | | | 29.70 |
| Image Plane | ∞ | | | | |

-continued unit mm

Aspherical Surface Data

25th surface

K = 0.00000e+000 A 4 = −3.15382e−006 A 6 = 8.92401e−008 A 8 = −2.62557e−010
A10 = 2.43136e−012 A12 = 1.92085e−015

26th surface

K = 0.00000e+000 A 4 = 1.94447e−005 A 6 = 8.00656e−008 A 8 = −7.14666e−011
A10 = 9.56772e−013 A12 = 8.59893e−015

Various Types of Data

Zoom Ratio 12.14

|  | Wide Angle | Intermediate | Telephoto |
|---|---|---|---|
| Focal Length | 24.30 | 85.03 | 294.97 |
| F-number | 4.12 | 5.40 | 6.49 |
| Half Angle of Field (degrees) | 37.76 | 14.28 | 4.19 |
| Image Height | 18.82 | 21.64 | 21.64 |
| Overall Lens Length | 148.20 | 195.38 | 239.44 |
| BF | 12.23 | 47.13 | 64.46 |
| d 5 | 0.99 | 33.28 | 72.72 |
| d12 | 25.32 | 11.82 | 2.35 |
| d24 | 10.75 | 4.24 | 1.00 |
| d29 | 12.19 | 7.00 | 1.50 |
| d32 | 9.00 | 14.19 | 19.69 |
| d36 | 12.23 | 47.13 | 64.46 |
| Position of Entrance Pupil | 34.49 | 99.87 | 333.71 |
| Position of Exit Pupil | −50.09 | −42.15 | −40.82 |
| Front Principal Point Position | 49.32 | 103.92 | −197.75 |
| Rear Principal Point Position | −12.07 | −37.90 | −230.51 |

Zoom Lens Unit Data

| Unit | Starting Surface | Focal Length | Lens Structure Length | Front Principal Point Position | Rear Principal Point Position |
|---|---|---|---|---|---|
| 1 | 1 | 124.17 | 17.33 | 3.93 | −7.47 |
| 2 | 6 | −20.13 | 15.22 | 3.67 | −6.89 |
| 3 | 13 | 82.61 | 20.22 | −13.32 | −23.37 |
| 4 | 25 | 28.71 | 16.17 | 6.35 | −5.70 |
| 5 | 30 | −61.09 | 4.02 | 3.78 | 1.63 |
| 6 | 33 | −126.25 | 4.76 | −4.03 | −6.83 |

Single Lens Element Data

| Lens | Starting Surface | Focal Length |
|---|---|---|
| 1 | 1 | −222.60 |
| 2 | 2 | 142.10 |
| 3 | 4 | 175.10 |
| 4 | 6 | −29.25 |
| 5 | 8 | −39.08 |
| 6 | 9 | 35.05 |
| 7 | 11 | −72.64 |
| 8 | 14 | 45.56 |
| 9 | 16 | 34.69 |
| 10 | 17 | −24.48 |
| 11 | 19 | −44.05 |
| 12 | 20 | 25.01 |
| 13 | 22 | 32.43 |
| 14 | 23 | −20.33 |
| 15 | 25 | 41.50 |
| 16 | 27 | −86.96 |
| 17 | 28 | 40.25 |
| 18 | 30 | 66.87 |
| 19 | 31 | −31.05 |
| 20 | 33 | −44.14 |
| 21 | 35 | 71.30 |

Numerical Example 2

| | unit mm | | | | |
|---|---|---|---|---|---|
| Surface Data | | | | | |
| Surface Number | r | d | nd | vd | Effective Diameter |
| 1 | 143.617 | 2.40 | 1.90366 | 31.3 | 62.20 |
| 2 | 83.786 | 8.23 | 1.49700 | 81.5 | 60.11 |
| 3 | −602.682 | 0.15 | | | 59.39 |
| 4 | 80.922 | 6.25 | 1.49700 | 81.5 | 55.70 |
| 5 | 786.036 | (variable) | | | 54.91 |
| 6 | −2448.226 | 1.75 | 1.76385 | 48.5 | 35.02 |
| 7 | 26.241 | 5.61 | | | 28.16 |
| 8 | −76.263 | 1.44 | 1.62299 | 58.2 | 27.92 |
| 9 | 29.070 | 4.30 | 1.89286 | 20.4 | 25.46 |
| 10 | 599.552 | 2.04 | | | 24.70 |
| 11 | −45.493 | 1.20 | 1.85150 | 40.8 | 24.47 |
| 12 | −249.022 | (variable) | | | 23.96 |
| 13 | 36.811 | 2.94 | 1.91082 | 35.3 | 19.44 |
| 14 | −198.958 | 1.50 | | | 19.38 |
| 15 (Aperture) | ∞ | 0.40 | | | 19.07 |
| 16 | 34.864 | 3.31 | 1.63980 | 34.5 | 18.76 |
| 17 | −83.784 | 1.00 | 2.00100 | 29.1 | 18.27 |
| 18 | 34.810 | 1.00 | | | 17.67 |
| 19 | 33.613 | 1.00 | 2.00069 | 25.5 | 17.75 |
| 20 | 21.338 | 3.89 | 1.56732 | 42.8 | 17.36 |
| 21 | −70.458 | 1.69 | | | 17.27 |
| 22 | −31.230 | 1.00 | 2.00069 | 25.5 | 17.03 |
| 23 | −105.706 | (variable) | | | 17.33 |
| 24* | −51.413 | 2.53 | 1.58313 | 59.4 | 22.24 |
| 25* | −34.214 | 0.28 | | | 23.36 |
| 26 | 40.125 | 1.30 | 1.85478 | 24.8 | 26.65 |
| 27 | 32.879 | 8.78 | 1.49700 | 81.5 | 26.79 |
| 28 | −28.072 | (variable) | | | 27.53 |
| 29 | 220.444 | 4.74 | 1.92286 | 18.9 | 26.47 |
| 30 | −48.490 | 1.43 | 1.90366 | 31.3 | 26.23 |
| 31 | 33.020 | (variable) | | | 25.65 |
| 32 | 242.194 | 1.82 | 1.53775 | 74.7 | 27.47 |
| 33 | 60.000 | 4.14 | 1.84666 | 23.8 | 28.60 |
| 34 | 130.522 | (variable) | | | 29.28 |
| Image Plane | ∞ | | | | |

Aspherical Surface Data

24th surface

K = 0.00000e+000 A 4 = −4. 79661e−007 A 6 = 1.44401e−007 A 8 = 5.68696e−010
A10 = −2.79803e−013 A12 = −1.23021e−014

25th surface

K = 0.00000e+000 A 4 = 1.72868e−005 A 6 = 1.42782e−007 A 8 = 3.68424e−010
A10 = 2.17951e−012 A12 = 1.70751e−014

Various Types of Data

Zoom Ratio 11.33

| | Wide Angle | Intermediate | Telephoto |
|---|---|---|---|
| Focal Length | 24.72 | 87.89 | 280.00 |
| F-number | 4.12 | 5.40 | 6.49 |
| Half Angle of Field (degrees) | 37.55 | 13.83 | 4.42 |
| Image Height | 19.00 | 21.64 | 21.64 |
| Overall Lens Length | 153.10 | 198.66 | 238.39 |
| BF | 14.32 | 43.02 | 51.45 |
| d 5 | 1.38 | 37.17 | 73.03 |
| d12 | 28.33 | 12.70 | 1.50 |
| d23 | 16.88 | 6.13 | 1.86 |
| d28 | 11.01 | 7.37 | 6.80 |
| d31 | 5.06 | 16.15 | 27.63 |
| d34 | 14.32 | 43.02 | 51.45 |
| Position of Entrance Pupil | 36.23 | 112.22 | 315.69 |
| Position of Exit Pupil | −52.93 | −46.53 | −53.61 |
| Front Principal Point Position | 51.87 | 113.85 | −150.56 |
| Rear Principal Point Position | −10.40 | −44.87 | −228.55 |

-continued unit mm

Zoom Lens Unit Data

| Unit | Starting Surface | Focal Length | Lens Structure Length | Front Principal Point Position | Rear Principal Point Position |
|---|---|---|---|---|---|
| 1 | 1 | 129.37 | 17.03 | 4.55 | −6.62 |
| 2 | 6 | −20.07 | 16.33 | 4.21 | −7.20 |
| 3 | 13 | 54.15 | 17.73 | −12.96 | −20.41 |
| 4 | 24 | 30.56 | 12.90 | 5.63 | −3.11 |
| 5 | 29 | −44.6 | 26.17 | 3.88 | 0.61 |
| 6 | 32 | 1007.43 | 5.96 | −16.16 | −19.27 |

Single Lens Element Data

| Lens | Starting Surface | Focal Length |
|---|---|---|
| 1 | 1 | −226.88 |
| 2 | 2 | 148.60 |
| 3 | 4 | 180.97 |
| 4 | 6 | −33.98 |
| 5 | 8 | −33.61 |
| 6 | 9 | 34.10 |
| 7 | 11 | −65.55 |
| 8 | 13 | 34.31 |
| 9 | 16 | 38.90 |
| 10 | 17 | −24.46 |
| 11 | 19 | −60.87 |
| 12 | 20 | 29.32 |
| 13 | 22 | −44.60 |
| 14 | 24 | 166.39 |
| 15 | 26 | −232.22 |
| 16 | 27 | 32.00 |
| 17 | 29 | 43.44 |
| 18 | 30 | −21.56 |
| 19 | 32 | −148.84 |
| 20 | 33 | 127.72 |

Numerical Example 3 unit mm

Surface Data

| Surface Number | r | d | nd | vd | Effective Diameter |
|---|---|---|---|---|---|
| 1 | 131.120 | 1.85 | 1.90366 | 31.3 | 56.81 |
| 2 | 68.310 | 8.50 | 1.49700 | 81.5 | 55.42 |
| 3 | −753.163 | 0.15 | | | 55.10 |
| 4 | 68.747 | 6.49 | 1.61800 | 63.4 | 53.51 |
| 5 | 673.951 | (variable) | | | 52.75 |
| 6 | 254.617 | 1.28 | 1.85150 | 40.8 | 27.70 |
| 7 | 20.691 | 4.73 | | | 22.48 |
| 8 | −57.767 | 1.09 | 1.85150 | 40.8 | 22.06 |
| 9 | 47.350 | 0.58 | | | 20.88 |
| 10 | 36.202 | 4.53 | 1.92286 | 20.9 | 20.63 |
| 11 | −61.289 | 0.80 | | | 19.68 |
| 12 | −33.271 | 1.03 | 1.77250 | 49.6 | 19.48 |
| 13 | 337.961 | (variable) | | | 18.62 |
| 14 (Aperture) | ∞ | 0.35 | | | 16.37 |
| 15 | 27.127 | 3.03 | 1.76182 | 26.5 | 17.08 |
| 16 | −1171.527 | 0.15 | | | 16.97 |
| 17 | 19.790 | 3.52 | 1.58144 | 40.8 | 16.71 |
| 18 | 2966.939 | 0.82 | 2.00100 | 29.1 | 16.01 |
| 19 | 20.527 | 2.68 | | | 15.27 |
| 20 | 35.971 | 0.80 | 2.00069 | 25.5 | 15.56 |
| 21 | 18.980 | 4.14 | 1.72000 | 43.7 | 15.32 |
| 22 | −63.414 | 2.19 | | | 15.25 |
| 23 | −26.193 | 0.80 | 2.00100 | 29.1 | 14.88 |
| 24 | −161.735 | (variable) | | | 15.19 |
| 25* | 45.834 | 2.42 | 1.53110 | 55.9 | 21.60 |
| 26* | 249.120 | 0.90 | | | 22.59 |
| 27 | −168.391 | 1.25 | 1.85478 | 24.8 | 22.76 |

-continued

| unit mm | | | | | |
|---|---|---|---|---|---|
| 28 | 173.745 | 5.51 | 1.59282 | 68.6 | 23.83 |
| 29 | −26.675 | 0.15 | | | 25.09 |
| 30 | 45.614 | 6.21 | 1.49700 | 81.5 | 27.28 |
| 31 | −45.413 | (variable) | | | 27.38 |
| 32 | 93.690 | 1.83 | 1.80000 | 29.8 | 25.53 |
| 33 | 332.137 | 1.10 | 1.64000 | 60.1 | 25.22 |
| 34 | 23.511 | (variable) | | | 24.07 |
| 35 | −52.595 | 1.28 | 1.83481 | 42.7 | 26.98 |
| 36 | 55.809 | 5.36 | 1.84666 | 23.9 | 29.03 |
| 37 | −108.959 | (variable) | | | 30.00 |
| Image Plane | ∞ | | | | |

Aspherical Surface Data

25th surface

K = 0.00000e+000 A 4 = −3.69552e−006 A 6 = −1.82063e−007 A 8 = 1.06130e−009
A10 = −1.28998e−011 A12 = 3.91238e−014

26th surface

K = 0.00000e+00 A 4 = 2.69060e−005 A 6 = −1.86518e−007 A 8 = 9.14337e−010
A10 = −1.12600e−011 A12 = 3.51294e−014

Various Types of Data

Zoom Ratio 9.42

| | Wide Angle | Intermediate | Telephoto |
|---|---|---|---|
| Focal Length | 24.72 | 85.00 | 232.80 |
| F-number | 4.12 | 5.66 | 6.41 |
| Half Angle of Field (degrees) | 37.55 | 14.28 | 5.31 |
| Image Height | 19.00 | 21.64 | 21.64 |
| Overall Lens Length | 142.45 | 184.29 | 214.45 |
| BF | 15.78 | 44.87 | 57.20 |
| d 5 | 1.35 | 32.74 | 59.27 |
| d13 | 22.27 | 8.68 | 2.35 |
| d24 | 8.55 | 3.25 | 1.00 |
| d31 | 3.81 | 4.58 | 1.55 |
| d34 | 15.15 | 14.65 | 17.54 |
| d37 | 15.78 | 44.87 | 57.20 |
| Position of Entrance Pupil | 30.65 | 98.92 | 259.23 |
| Position of Exit Pupil | −58.85 | −45.03 | −42.46 |
| Front Principal Point Position | 47.18 | 103.55 | −51.77 |
| Rear Principal Point Position | −8.94 | −40.13 | −175.60 |

Zoom Lens Unit Data

| nit | Starting Surface | Focal Length | Lens Structure Length | Front Principal Point Position | Rear Principal Point Position |
|---|---|---|---|---|---|
| 1 | 1 | 103.73 | 16.99 | 5.22 | −5.67 |
| 2 | 6 | −16.78 | 14.05 | 2.75 | −6.90 |
| 3 | 14 | 61.09 | 18.48 | −20.56 | −25.29 |
| 4 | 25 | 22.88 | 16.44 | 7.18 | −4.32 |
| 5 | 32 | −53.26 | 2.93 | 2.48 | 0.75 |
| 6 | 35 | −134.27 | 6.64 | −3.78 | −7.59 |

Single Lens Element Data

| Lens | Starting Surface | Focal Length |
|---|---|---|
| 1 | 1 | −160.04 |
| 2 | 2 | 126.45 |
| 3 | 4 | 123.37 |
| 4 | 6 | −26.52 |
| 5 | 8 | −30.41 |
| 6 | 10 | 25.22 |
| 7 | 12 | −39.16 |
| 8 | 15 | 34.84 |
| 9 | 17 | 34.25 |
| 10 | 18 | −20.65 |
| 11 | 20 | −41.12 |
| 12 | 21 | 20.72 |
| 13 | 23 | −31.32 |
| 14 | 25 | 105.32 |
| 15 | 27 | −99.87 |

-continued

| | unit mm | |
|---|---|---|
| 16 | 28 | 39.41 |
| 17 | 30 | 46.85 |
| 18 | 32 | 162.57 |
| 19 | 33 | -39.59 |
| 20 | 35 | -32.26 |
| 21 | 36 | 44.25 |

Numerical Example 4

| unit mm | | | | | |
|---|---|---|---|---|---|
| Surface Data | | | | | |
| Surface Number | r | d | nd | vd | Effective Diameter |
| 1 | 159.830 | 1.90 | 1.95375 | 32.3 | 60.00 |
| 2 | 94.730 | 7.83 | 1.49700 | 81.5 | 59.00 |
| 3 | -269.099 | 0.15 | | | 58.78 |
| 4 | 72.354 | 4.93 | 1.49700 | 81.5 | 56.26 |
| 5 | 175.838 | (variable) | | | 55.54 |
| 6 | 184.180 | 1.25 | 1.88300 | 40.8 | 30.39 |
| 7 | 22.733 | 4.72 | | | 25.23 |
| 8 | -114.801 | 1.15 | 1.81600 | 46.6 | 25.01 |
| 9 | 32.066 | 3.03 | 1.89286 | 20.4 | 23.40 |
| 10 | 53.730 | 0.20 | | | 22.56 |
| 11 | 36.255 | 3.71 | 1.85896 | 22.7 | 22.26 |
| 12 | -134.742 | 2.72 | | | 21.47 |
| 13 | -35.468 | 1.05 | 1.88300 | 40.8 | 19.13 |
| 14 | 2278.179 | (variable) | | | 18.48 |
| 15 (Aperture) | ∞ | 0.21 | | | 18.76 |
| 16 | 57.181 | 3.06 | 1.83481 | 42.7 | 19.29 |
| 17 | -57.747 | 0.15 | | | 19.44 |
| 18 | 41.068 | 4.15 | 1.49700 | 81.5 | 19.27 |
| 19 | -31.694 | 1.78 | 2.00069 | 25.5 | 18.93 |
| 20 | -106.535 | 1.28 | | | 18.93 |
| 21 | 333.024 | 1.33 | 2.00069 | 25.5 | 18.61 |
| 22 | 53.972 | 2.20 | | | 18.37 |
| 23 | -36.939 | 0.80 | 1.53775 | 74.7 | 18.40 |
| 24 | 51.235 | 2.66 | 2.00069 | 25.5 | 19.12 |
| 25 | -267.988 | (variable) | | | 19.28 |
| 26* | 35.662 | 6.30 | 1.59522 | 67.7 | 22.66 |
| 27* | -37.172 | 0.84 | | | 23.24 |
| 28 | -241.941 | 1.00 | 2.00100 | 29.1 | 23.30 |
| 29 | 41.065 | 8.38 | 1.48749 | 70.2 | 23.50 |
| 30 | -27.647 | (variable) | | | 24.64 |
| 31 | 47.747 | 2.60 | 1.85896 | 22.7 | 24.37 |
| 32 | 235.002 | 0.90 | 1.91082 | 35.3 | 24.03 |
| 33 | 28.115 | (variable) | | | 23.25 |
| 34 | -39.766 | 1.00 | 1.95375 | 32.3 | 24.57 |
| 35 | 36.123 | 5.55 | 1.85896 | 22.7 | 27.38 |
| 36 | -73.000 | (variable) | | | 28.24 |
| Image Plane | ∞ | | | | |

Aspherical Surface Data

26th surface

K = 0.00000e+000 A 4 = -1.08436e-005 A 6 = 4.17684e-009 A 8 = 1.56372e-010
A10 = -1.37020e-012 A12 = 3.08084e-015

27th surface

K = 0.00000e+000 A 4 = 1.71699e-005 A 6 = -8.18445e-009 A 8 = 1.23550e-010
A10 = -1.04479e-012 A12 = 2.33114e-015

Various Types of Data

Zoom Ratio 10.91

| | Wide Angle | Intermediate | Telephoto |
|---|---|---|---|
| Focal Length | 24.74 | 79.99 | 269.98 |
| F-number | 4.50 | 5.60 | 7.10 |

-continued

| unit mm | | | |
|---|---|---|---|
| Half Angle of Field (degrees) | 38.67 | 15.14 | 4.58 |
| Image Height | 19.80 | 21.64 | 21.64 |
| Overall Lens Length | 144.04 | 190.40 | 246.62 |
| BF | 13.50 | 47.65 | 65.57 |
| d 5 | 0.85 | 33.41 | 80.40 |
| d14 | 22.69 | 10.60 | 3.00 |
| d25 | 15.2 | 75.24 | 1.03 |
| d30 | 6.77 | 3.26 | 1.60 |
| d33 | 8.13 | 13.40 | 18.19 |
| d36 | 13.50 | 47.65 | 65.57 |
| Position of Entrance Pupil | 30.18 | 87.88 | 317.98 |
| Position of Exit Pupil | −43.68 | −35.24 | −33.78 |
| Front Principal Point Position | 44.21 | 90.68 | −145.67 |
| Rear Principal Point Position | −11.24 | −32.34 | −204.41 |

Zoom Lens Unit Data

| Unit | Starting Surface | Focal Length | Lens Structure Length | Front Principal Point Position | Rear Principal Point Position |
|---|---|---|---|---|---|
| 1 | 1 | 141.20 | 14.81 | 3.36 | −6.30 |
| 2 | 6 | −17.65 | 17.83 | 4.29 | −7.22 |
| 3 | 15 | 46.82 | 17.61 | −4.11 | −14.75 |
| 4 | 26 | 32.45 | 16.53 | 5.58 | −6.52 |
| 5 | 31 | −76.34 | 3.50 | 4.59 | 2.57 |
| 6 | 34 | −72.50 | 6.55 | −2.89 | −6.66 |

Single Lens Element Data

| Lens | Starting Surface | Focal Length |
|---|---|---|
| 1 | 1 | −247.38 |
| 2 | 2 | 141.99 |
| 3 | 4 | 243.52 |
| 4 | 6 | −29.48 |
| 5 | 8 | −30.61 |
| 6 | 9 | 83.56 |
| 7 | 11 | 33.60 |
| 8 | 13 | −39.54 |
| 9 | 16 | 34.84 |
| 10 | 18 | 36.69 |
| 11 | 19 | −45.63 |
| 12 | 21 | −64.52 |
| 13 | 23 | −39.79 |
| 14 | 24 | 43.16 |
| 15 | 26 | 31.60 |
| 16 | 28 | −35.01 |
| 17 | 29 | 35.31 |
| 18 | 31 | 69.32 |
| 19 | 32 | −35.14 |
| 20 | 34 | −19.72 |
| 21 | 35 | 28.81 |

Numerical Example 5

| unit mm | | | | | |
|---|---|---|---|---|---|
| Surface Data | | | | | |
| Surface Number | r | d | nd | vd | Effective Diameter |
| 1 | 130.814 | 1.85 | 1.85025 | 30.1 | 56.51 |
| 2 | 69.416 | 7.99 | 1.49700 | 81.5 | 55.11 |
| 3 | −2086.590 | 0.15 | | | 54.71 |
| 4 | 68.855 | 6.30 | 1.60300 | 65.4 | 53.03 |
| 5 | 516.189 | (variable) | | | 52.22 |
| 6 | 159.304 | 1.28 | 1.85150 | 40.8 | 27.54 |
| 7 | 21.523 | 4.83 | | | 22.75 |
| 8 | −54.834 | 1.09 | 1.83400 | 37.2 | 22.22 |
| 9 | 51.882 | 1.38 | | | 21.06 |
| 10 | 46.488 | 3.90 | 1.92286 | 18.9 | 20.62 |
| 11 | −63.719 | 1.01 | | | 19.89 |

-continued

| unit mm | | | | | |
|---|---|---|---|---|---|
| 12 | −32.600 | 1.03 | 1.75500 | 52.3 | 19.53 |
| 13 | 2153.054 | (variable) | | | 18.83 |
| 14 (Aperture) | ∞ | 0.35 | | | 14.74 |
| 15 | 29.820 | 4.02 | 1.76200 | 40.1 | 15.26 |
| 16 | 452.957 | 0.15 | | | 15.21 |
| 17 | 22.394 | 3.98 | 1.58267 | 46.4 | 15.20 |
| 18 | 110.222 | 0.82 | 1.95375 | 32.3 | 14.44 |
| 19 | 22.609 | 2.05 | | | 14.03 |
| 20 | 32.771 | 0.80 | 2.00100 | 29.1 | 14.29 |
| 21 | 17.525 | 3.72 | 1.72000 | 42.0 | 14.07 |
| 22 | −66.125 | (variable) | | | 14.01 |
| 23 | −29.267 | 0.80 | 2.00100 | 29.1 | 13.47 |
| 24 | −107.672 | (variable) | | | 13.66 |
| 25* | 51.345 | 2.15 | 1.56883 | 56.4 | 22.19 |
| 26* | 94.496 | 1.57 | | | 23.13 |
| 27 | −118.928 | 1.25 | 1.90366 | 31.3 | 23.55 |
| 28 | 112.336 | 6.26 | 1.59522 | 67.7 | 24.79 |
| 29 | −29.733 | 0.15 | | | 26.39 |
| 30 | 43.123 | 5.33 | 1.49700 | 81.5 | 29.00 |
| 31 | −59.141 | (variable) | | | 29.05 |
| 32 | 472.486 | 3.56 | 1.75520 | 27.5 | 27.28 |
| 33 | −44.196 | 1.10 | 1.71300 | 53.9 | 27.13 |
| 34 | 30.610 | (variable) | | | 26.20 |
| Image Plane | ∞ | | | | |

Aspherical Surface Data

25th surface $K = 0.00000e+000$ $A4 = -1.44120e-005$ $A6 = -1.72139e-007$ $A8 = 6.29388e-010$
$A10 = -6.67987e-012$ $A12 = 2.15798e-014$ 26th surface $K = 0.00000e+000$ $A4 = 5.28509e-006$ $A6 = -1.70632e-007$ $A8 = 4.72211e-010$
$A10 = -4.49686e-012$ $A12 = 1.50425e-014$ Various Types of Data Zoom Ratio 7.71

| | Wide Angle | Intermediate | Telephoto |
|---|---|---|---|
| Focal Length | 25.95 | 83.22 | 200.00 |
| F-number | 4.50 | 5.80 | 7.10 |
| Half Angle of Field (degrees) | 36.21 | 14.57 | 6.17 |
| Image Height | 19.00 | 21.64 | 21.64 |
| Overall Lens Length | 147.00 | 185.42 | 216.53 |
| BF | 31.56 | 58.54 | 75.59 |
| d 5 | 1.33 | 33.26 | 58.29 |
| d13 | 23.91 | 7.79 | 2.35 |
| d22 | 2.66 | 2.98 | 3.66 |
| d24 | 12.15 | 5.31 | 2.57 |
| d31 | 6.52 | 8.67 | 5.19 |
| d34 | 31.56 | 58.54 | 75.59 |
| Position of Entrance Pupil | 31.01 | 97.95 | 231.24 |
| Position of Exit Pupil | −54.99 | −38.02 | −33.33 |
| Front Principal Point Position | 49.18 | 109.44 | 64.00 |
| Rear Principal Point Position | 5.61 | −24.68 | −124.41 |

Zoom Lens Unit Data

| Unit | Starting Surface | Focal Length | Lens Structure Length | Front Principal Point Position | Rear Principal Point Position |
|---|---|---|---|---|---|
| 1 | 1 | 108.63 | 16.29 | 4.51 | −5.97 |
| 2 | 6 | −17.13 | 14.53 | 2.91 | −7.56 |
| 3 | 14 | 27.57 | 15.89 | 2.30 | −8.82 |
| 4 | 23 | −40.36 | 0.80 | −0.15 | −0.55 |
| 5 | 25 | 29.36 | 16.71 | 8.63 | −2.90 |
| 6 | 32 | −48.48 | 4.66 | 2.92 | 0.24 |

Single Lens Element Data

| Lens | Starting Surface | Focal Length |
|---|---|---|
| 1 | 1 | −176.39 |
| 2 | 2 | 135.34 |

-continued

| | unit mm | |
|---|---|---|
| 3 | 4 | 131.07 |
| 4 | 6 | −29.35 |
| 5 | 8 | −31.82 |
| 6 | 10 | 29.63 |
| 7 | 12 | −42.53 |
| 8 | 15 | 41.72 |
| 9 | 17 | 47.44 |
| 10 | 18 | −29.96 |
| 11 | 20 | −38.65 |
| 12 | 21 | 19.61 |
| 13 | 23 | −40.36 |
| 14 | 25 | 194.16 |
| 15 | 27 | −63.76 |
| 16 | 28 | 40.16 |
| 17 | 30 | 51.06 |
| 18 | 32 | 53.68 |
| 19 | 33 | −25.21 |

Numerical Example 6

| unit mm | | | | | |
|---|---|---|---|---|---|
| Surface Data | | | | | |
| Surface Number | r | d | nd | vd | Effective Diameter |
| 1 | 110.902 | 2.00 | 1.90366 | 31.3 | 60.00 |
| 2 | 70.024 | 7.70 | 1.49700 | 81.5 | 58.46 |
| 3 | 721.865 | 0.15 | | | 58.05 |
| 4 | 68.200 | 7.25 | 1.49700 | 81.5 | 56.42 |
| 5 | 606.641 | (variable) | | | 55.56 |
| 6 | 606.644 | 1.50 | 1.85150 | 40.8 | 29.18 |
| 7 | 25.291 | 4.16 | | | 24.66 |
| 8 | −101.202 | 1.40 | 1.53775 | 74.7 | 24.47 |
| 9 | 29.065 | 3.84 | 1.89286 | 20.4 | 22.48 |
| 10 | −764.565 | 1.45 | | | 21.70 |
| 11 | −45.176 | 1.20 | 1.83481 | 42.7 | 21.44 |
| 12 | 176.271 | (variable) | | | 20.64 |
| 13 (Aperture) | ∞ | 0.40 | | | 15.02 |
| 14 | 34.823 | 3.18 | 1.58144 | 40.8 | 15.48 |
| 15 | −70.817 | 0.20 | | | 15.59 |
| 16 | 30.878 | 3.55 | 1.60342 | 38.0 | 15.52 |
| 17 | −56.409 | 1.00 | 1.95375 | 32.3 | 15.07 |
| 18 | 38.938 | 1.02 | | | 14.78 |
| 19 | 39.816 | 1.00 | 2.00100 | 29.1 | 14.90 |
| 20 | 20.275 | 3.83 | 1.71700 | 47.9 | 14.68 |
| 21 | −71.673 | (variable) | | | 14.62 |
| 22 | −26.968 | 2.90 | 1.91650 | 31.6 | 14.22 |
| 23 | −13.925 | 1.00 | 1.80100 | 35.0 | 14.51 |
| 24 | −297.709 | (variable) | | | 14.79 |
| 25* | 55.100 | 5.35 | 1.58313 | 59.4 | 23.22 |
| 26* | −36.088 | 2.85 | | | 23.80 |
| 27 | 138.847 | 1.50 | 1.85478 | 24.8 | 24.93 |
| 28 | 47.891 | 9.99 | 1.43875 | 94.7 | 25.04 |
| 29 | −26.107 | (variable) | | | 26.08 |
| 30 | 4536.734 | 4.25 | 2.00069 | 25.5 | 24.36 |
| 31 | −29.924 | 1.35 | 1.89190 | 37.1 | 24.19 |
| 32 | 35.629 | (variable) | | | 23.26 |
| 33 | −23.054 | 1.50 | 1.91650 | 31.6 | 24.26 |
| 34 | −99.305 | 5.29 | 1.89286 | 20.4 | 27.21 |
| 35 | −33.974 | (variable) | | | 29.36 |
| Image Plane | ∞ | | | | |

| Aspherical Surface Data |
|---|
| 25th surface |

K = 0.00000e+000 A4 = −4.62964e−006 A 6 = 4.48621e−008 A 8 = 1.40226e−010
A10 = −3.60276e−013 A12 = 2.30562e−015

-continued

| unit mm |
| --- |

26th surface

K = 0.00000e+000 A 4 = 1.94445e−005 A 6 = 4.39314e−008 A 8 = 1.38140e−010
A10 = 1.74595e−013 A12 = 1.31257e−015

Various Types of Data

Zoom Ratio 7.86

|  | Wide Angle | Intermediate | Telephoto |
| --- | --- | --- | --- |
| Focal Length | 28.00 | 70.00 | 220.00 |
| F-number | 4.12 | 5.40 | 6.49 |
| Half Angle of Field (degrees) | 34.16 | 17.18 | 5.62 |
| Image Height | 19.00 | 21.64 | 21.64 |
| Overall Lens Length | 145.54 | 173.70 | 209.15 |
| BF | 11.43 | 28.68 | 26.01 |
| d 5 | 0.75 | 26.69 | 67.57 |
| d12 | 24.14 | 11.38 | 2.35 |
| d21 | 3.00 | 2.97 | 2.00 |
| d24 | 11.68 | 5.61 | 1.00 |
| d29 | 5.25 | 5.21 | 1.50 |
| d32 | 8.48 | 12.35 | 27.90 |
| d35 | 11.43 | 28.68 | 26.01 |
| Position of Entrance Pupil | 33.28 | 80.03 | 272.56 |
| Position of Exit Pupil | −51.93 | −45.22 | −47.82 |
| Front Principal Point Position | 48.90 | 83.73 | −162.92 |
| Rear Principal Point Position | −16.57 | −41.32 | −193.98 |

Zoom Lens Unit Data

| Unit | Starting Surface | Focal Length | Lens Structure Length | Front Principal Point Position | Rear Principal Point Position |
| --- | --- | --- | --- | --- | --- |
| 1 | 1 | 123.72 | 17.10 | 3.34 | −7.92 |
| 2 | 6 | −19.34 | 13.55 | 3.75 | −5.40 |
| 3 | 13 | 29.14 | 14.18 | 2.19 | −7.31 |
| 4 | 22 | −44.65 | 3.90 | −0.81 | −2.92 |
| 5 | 25 | 27.90 | 19.69 | 7.26 | −8.47 |
| 6 | 30 | −47.40 | 5.60 | 2.99 | 0.15 |
| 7 | 33 | −105.17 | 6.79 | −9.91 | −14.89 |

Single Lens Element Data

| Lens | Starting Surface | Focal Length |
| --- | --- | --- |
| 1 | 1 | −215.23 |
| 2 | 2 | 155.42 |
| 3 | 4 | 153.92 |
| 4 | 6 | −31.03 |
| 5 | 8 | −41.83 |
| 6 | 9 | 31.43 |
| 7 | 11 | −42.97 |
| 8 | 14 | 40.60 |
| 9 | 16 | 33.58 |
| 10 | 17 | −24.03 |
| 11 | 19 | −42.35 |
| 12 | 20 | 22.43 |
| 13 | 22 | 28.40 |
| 14 | 23 | −18.27 |
| 15 | 25 | 38.22 |
| 16 | 27 | −86.18 |
| 17 | 28 | 40.16 |
| 18 | 30 | 29.72 |
| 19 | 31 | −18.06 |
| 20 | 33 | −33.07 |
| 21 | 34 | 55.71 |

Numerical Example 7

| | | | unit mm | | |
|---|---|---|---|---|---|
| | | | Surface Data | | |
| Surface Number | r | d | nd | vd | Effective Diameter |
| 1 | 73.114 | 2.00 | 1.71736 | 29.5 | 59.00 |
| 2 | 53.750 | 9.22 | 1.49700 | 81.5 | 55.03 |
| 3 | 265.884 | 0.15 | | | 51.61 |
| 4 | 123.623 | 4.38 | 1.49700 | 81.5 | 48.95 |
| 5 | 521.726 | (variable) | | | 45.79 |
| 6 | 140.486 | 1.50 | 2.00100 | 29.1 | 41.28 |
| 7 | 29.327 | 7.61 | | | 35.00 |
| 8 | −137.779 | 1.40 | 1.53775 | 74.7 | 34.46 |
| 9 | 32.226 | 6.11 | 1.89286 | 20.4 | 32.03 |
| 10 | −370.208 | 6.29 | | | 31.27 |
| 11 | −43.812 | 1.20 | 1.83400 | 37.2 | 25.89 |
| 12 | 2951.301 | (variable) | | | 25.18 |
| 13 (Aperture) | ∞ | 0.40 | | | 19.05 |
| 14 | 28.167 | 3.54 | 1.65412 | 39.7 | 19.95 |
| 15 | −336.514 | 1.08 | | | 19.84 |
| 16 | 38.028 | 6.16 | 1.64769 | 33.8 | 19.45 |
| 17 | −50.895 | 1.00 | 1.95375 | 32.3 | 18.23 |
| 18 | 31.311 | 1.21 | | | 17.64 |
| 19 | 36.919 | 1.22 | 1.95375 | 32.3 | 17.83 |
| 20 | 19.637 | 3.96 | 1.69350 | 50.8 | 17.50 |
| 21 | −96.605 | 1.89 | | | 17.47 |
| 22 | −30.254 | 3.40 | 1.89190 | 37.1 | 17.30 |
| 23 | −13.907 | 1.50 | 1.80100 | 35.0 | 17.60 |
| 24 | 375.894 | 9.32 | | | 18.19 |
| 25* | 65.535 | 4.06 | 1.58313 | 59.4 | 23.44 |
| 26* | −45.696 | 11.95 | | | 23.90 |
| 27 | 134.050 | 1.50 | 1.91650 | 31.6 | 29.64 |
| 28 | 55.583 | 9.68 | 1.49700 | 81.5 | 29.93 |
| 29 | −26.816 | (variable) | | | 30.76 |
| 30 | −772.801 | 3.88 | 2.00069 | 25.5 | 27.62 |
| 31 | −38.671 | 1.35 | 1.89190 | 37.1 | 27.47 |
| 32 | 60.440 | (variable) | | | 26.65 |
| 33 | −34.241 | 1.50 | 1.89190 | 37.1 | 27.00 |
| 34 | 608.875 | 4.28 | 1.92286 | 18.9 | 29.03 |
| 35 | −90.034 | (variable) | | | 30.29 |
| Image Plane | ∞ | | | | |

Aspherical Surface Data

25th surface

K = 0.00000e+000 A 4 = −5.95452e−007 A 6 = 5.55283e−008 A 8 = 1.28438e−010
A10 = −2.78022e−014 A12 = 2.32006e−015

26th surface

K = 0.00000e+000 A 4 = 1.68186e−005 A 6 = 6.56287e−008 A 8 = 1.50018e−010
A10 = 4.70835e−013 A12 = 1.81236e−015

Various Types of Data

Zoom Ratio 5.92

| | Wide Angle | Intermediate | Telephoto |
|---|---|---|---|
| Focal Length | 30.42 | 63.05 | 180.00 |
| F-number | 4.00 | 5.60 | 6.30 |
| Half Angle of Field (degrees) | 31.99 | 18.94 | 6.85 |
| Image Height | 19.00 | 21.64 | 21.64 |
| Overall Lens Length | 175.01 | 196.84 | 247.76 |
| BF | 12.22 | 27.10 | 39.24 |
| d 5 | 0.75 | 18.81 | 55.75 |
| d12 | 33.63 | 16.84 | 2.35 |
| d29 | 8.33 | 5.80 | 1.50 |
| d32 | 7.36 | 15.55 | 36.19 |
| d35 | 12.22 | 27.10 | 39.24 |
| Position of Entrance Pupil | 43.23 | 72.89 | 183.04 |
| Position of Exit Pupil | −46.68 | −47.77 | −50.18 |
| Front Principal Point Position | 57.94 | 82.84 | 0.69 |
| Rear Principal Point Position | −18.20 | −35.95 | −140.76 |

-continued unit mm

Zoom Lens Unit Data

| Unit | Starting Surface | Focal Length | Lens Structure Length | Front Principal Point Position | Rear Principal Point Position |
|---|---|---|---|---|---|
| 1 | 1 | 144.49 | 15.74 | 0.25 | −10.16 |
| 2 | 6 | −24.08 | 24.10 | 6.73 | −9.77 |
| 3 | 13 | 45.56 | 61.88 | 52.70 | −45.22 |
| 4 | 30 | −75.46 | 5.23 | 2.54 | −0.11 |
| 5 | 33 | −66.93 | 5.78 | −2.07 | −5.26 |

Single Lens Element Data

| Lens | Starting Surface | Focal Length |
|---|---|---|
| 1 | 1 | −295.66 |
| 2 | 2 | 133.62 |
| 3 | 4 | 324.79 |
| 4 | 6 | −37.28 |
| 5 | 8 | −48.43 |
| 6 | 9 | 33.44 |
| 7 | 11 | −51.76 |
| 8 | 14 | 39.89 |
| 9 | 16 | 34.55 |
| 10 | 17 | −20.21 |
| 11 | 19 | −45.56 |
| 12 | 20 | 23.87 |
| 13 | 22 | 26.28 |
| 14 | 23 | −16.71 |
| 15 | 25 | 46.80 |
| 16 | 27 | −104.56 |
| 17 | 28 | 37.87 |
| 18 | 30 | 40.57 |
| 19 | 31 | −26.27 |
| 20 | 33 | −36.31 |
| 21 | 34 | 85.24 |

TABLE 1

| Numerical Examples | 1 | 2 | 3 | 4 | 5 | 6 | 7 |
|---|---|---|---|---|---|---|---|
| fw | 24.30 | 24.72 | 24.72 | 24.74 | 25.95 | 28.00 | 30.42 |
| skw | 12.23 | 14.32 | 15.78 | 13.50 | 31.56 | 11.43 | 12.22 |
| f1 | 124.17 | 129.37 | 103.73 | 141.20 | 108.63 | 123.72 | 144.49 |
| f2 | −20.13 | −20.07 | −16.78 | −17.65 | −17.13 | −19.34 | −24.08 |
| Rg2r1 | −25607.67 | −2448.23 | 254.62 | 184.18 | 159.30 | 606.64 | 140.49 |
| Rg2r2 | −1213.11 | −249.02 | 337.96 | 2278.12 | 2153.05 | 176.27 | 2951.30 |
| fn | −40.45 | −46.12 | −36.09 | −36.53 | −48.48 | −33.01 | −34.18 |
| fp | 33.48 | 39.60 | 32.54 | 34.79 | 38.47 | 35.31 | 45.56 |
| Rg1r1 | 112.15 | 143.62 | 131.12 | 159.83 | 130.81 | 110.90 | 73.11 |
| Rg1r2 | 1699.73 | 786.04 | 673.95 | 175.84 | 516.19 | 606.64 | 521.73 |
| fw/skw of Expression (1) | 1.99 | 1.73 | 1.57 | 1.83 | 0.82 | 2.45 | 2.49 |
| f1/f2 of Expression (2) | −6.17 | −6.45 | −6.18 | −8.00 | −6.34 | −6.40 | −6.00 |
| \|(Rg2r1 + Rg2r2)/(Rg2r1 − Rg2r2)\| of Expression (3) | 1.10 | 1.23 | 7.11 | 1.18 | 1.16 | 1.82 | 1.10 |
| fn/fp of Expression (4) | −1.21 | −1.16 | −1.11 | −1.05 | −1.26 | −0.94 | −0.75 |
| \|(Rg1r1 + Rg1r2)/(Rg1r1 − Rg1r2)\| of Expression (5) | 1.14 | 1.45 | 1.48 | 20.97 | 1.68 | 1.45 | 1.33 |
| f1/skw of Expression (6) | 10.15 | 9.03 | 6.57 | 10.46 | 3.44 | 10.83 | 11.83 |
| f2/skw of Expression (7) | −1.65 | −1.40 | −1.06 | −1.31 | −0.54 | −1.69 | −1.97 |

Image Capturing Apparatus

Figure 15:
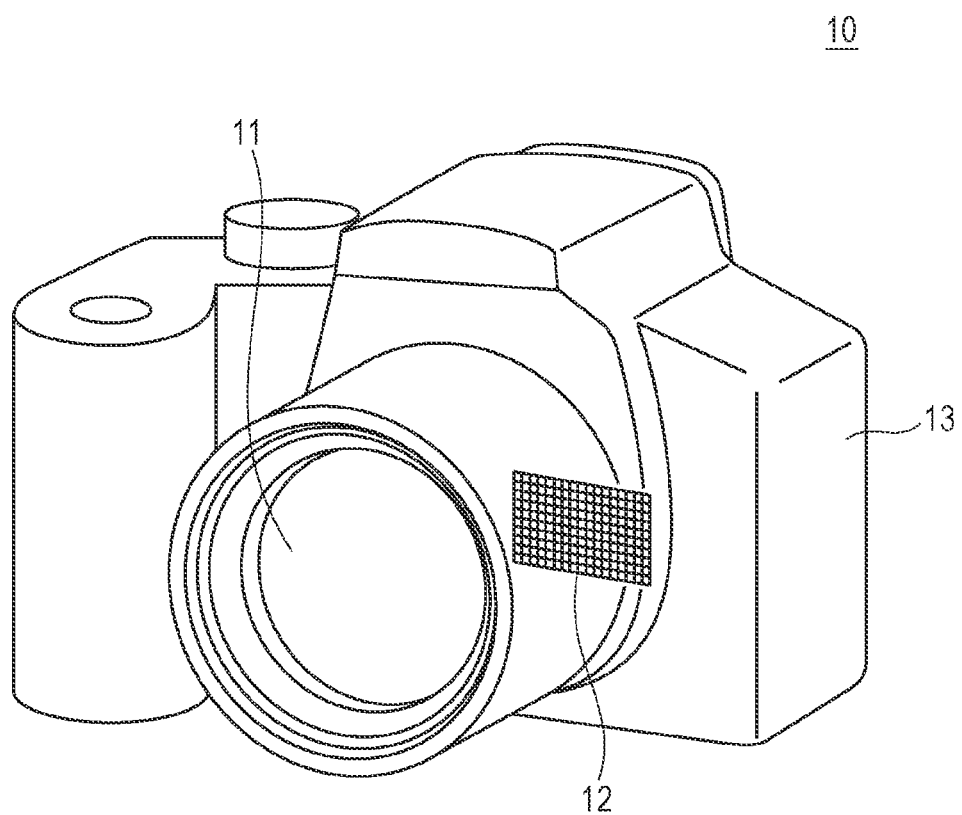
FIG. 15 is a diagram illustrating a configuration of an image capturing apparatus of an exemplary embodiment.

Next, an exemplary embodiment of the image capturing apparatus will be described with reference to FIG. 15. FIG. 15 is a diagram illustrating a configuration of an image capturing apparatus 10. The image capturing apparatus 10 includes a camera body 13, a lens apparatus 11 including the zoom lens ZL of any of the first to fourth exemplary embodiments, and a light receiving element (image sensor) 12, which photoelectrically converts an image formed by the zoom lens ZL. As the light receiving element 12, an image sensor such as a CCD sensor or a CMOS sensor can be used. The lens apparatus 11 and the camera body 13 may be configured integrally or may be configured to be mountable. The image capturing apparatus 10 of the present exemplary embodiment can perform high-speed focusing and can obtain high optical performance over the entire object length.

Note that the image capturing apparatus of an exemplary embodiment of the disclosure is not limited to the digital still camera illustrated in FIG. 15, but the disclosure can be applied to various image capturing apparatuses such as a broadcast camera, a silver-halide film camera, and a monitoring camera.

The exemplary embodiments of the disclosure have been described above, but the disclosure is not limited to these exemplary embodiments, and various combinations, modifications, and changes can be made within the scope of the gist.

For example, the aperture stop SP may be included in a lens unit other than the third lens unit as long as it is a lens unit located closer to the object side than the N−1th lens unit.

For example, in a zoom lens, image shake correction may be performed by moving some lenses in a direction including a component orthogonal to the optical axis. Alternatively, the zoom lens may have an optical element having no refractive power such as a diffractive optical element.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A zoom lens comprising:
a first lens unit having a positive refractive power; a second lens unit having a negative refractive power; a third lens unit having a positive refractive power; a fourth lens unit having a positive refractive power; a fifth lens unit having a negative refractive power as an N−1th lens unit; and a sixth lens unit having a negative refractive power as an Nth lens unit, the lens units being arranged in order from an object side to an image side, and a distance between adjacent ones of the lens units changing during zooming,
wherein the N−1th lens unit is arranged second from the image side and the Nth lens unit is arranged closest to the image side among the lens units arranged in the zoom lens,
wherein the N−1th lens unit and the Nth lens unit are located on the image side with respect to an aperture stop,
wherein the N−1th lens unit is referred to as an image-side lens unit, and consists of one cemented lens including a positive lens and a negative lens,
wherein a combined refractive power of lenses from a lens unit having the aperture stop to a lens unit located adjacent to the object side of the image-side lens unit at a wide-angle end when focusing on an object at infinity is a positive refractive power,
wherein the following inequalities are satisfied:

$0.40 < fw/skw < 2.90$ $-8.50 < f1/f2 < -5.90$ $2.70 < f1/skw < 25.00$, and where fw is a focal length of the zoom lens at the wide-angle end when focusing on an object at infinity, skw is a back focus at the wide-angle end when focusing on an object at infinity, f1 is a focal length of the first lens unit, f2 is a focal length of the second lens unit.

2. The zoom lens according to claim 1 wherein the following inequality is satisfied:

$0.80 < |(Rg1r1+Rg1r2)/(Rg1r1-Rg1r2)|$ where Rg1r1 is a curvature radius of a surface at a most object side of the first lens unit, and Rg1r2 is a curvature radius of a surface at a most image side of the first lens unit.

3. The zoom lens according to claim 1, wherein the following inequality is satisfied:

$-1.27 < fn/fp < -0.70$ where fp is a combined focal length of the lenses from a lens unit having the aperture stop to a lens unit located adjacent to the object side of the image-side lens unit at the wide-angle end when focusing on an object at infinity, and fn is a combined focal length of the lenses from the image-side lens unit to the image plane at the wide-angle end when focusing on an object at infinity.

4. The zoom lens according to claim 1, wherein the following inequality is satisfied:

$-3.00 < f2/skw < -0.35$.

5. The zoom lens according to claim 1, wherein all lenses included in the second lens unit are spherical lenses.

6. The zoom lens according to claim 1, wherein all lenses located on the object side with respect to the aperture stop are spherical lenses.

7. The zoom lens according to claim 1, wherein the image-side lens unit includes a positive lens.

8. The zoom lens according to claim 1, wherein at least one of the N−1th lens unit and the Nth lens unit moves during focusing.

9. The zoom lens according to claim 1, wherein the third lens unit has the aperture stop.

10. An image capturing apparatus comprising:
a zoom lens; and
an image sensor that receives an image formed by the zoom lens,
wherein the zoom lens includes
a first lens unit having a positive refractive power, a second lens unit having a negative refractive power, a third lens unit having a positive refractive power, a fourth lens unit having a positive refractive power; a fifth lens unit having a negative refractive power as an N−1th lens unit, and a sixth lens unit having a negative refractive power as an Nth lens unit, and the lens units being arranged in order from an object side to an image side,
wherein a distance between adjacent ones of the lens units changes during zooming,
wherein the N−1th lens unit is arranged second from the image side and the Nth lens unit is arranged closest to the image side among the lens units arranged in the zoom lens,
wherein the N−1th lens unit and the Nth lens unit are located on the image side with respect to an aperture stop,
wherein the N−1th lens unit is referred to as an image-side lens unit, and consists of one cemented lens including a positive lens and a negative lens,
wherein a combined refractive power of lenses from a lens unit having the aperture stop to a lens unit located adjacent to the object side of the image-side lens unit at a wide-angle end when focusing on an object at infinity is a positive refractive power, wherein the following inequalities are satisfied:

$$0.40 < fw/skw < 2.90$$

$$-8.50 < f1/f2 < -5.90$$

$$2.70 < f1/skw < 25.00, \text{ and}$$

where fw is a focal length of the zoom lens at the wide-angle end when focusing on an object at infinity, skw is a back focus at the wide-angle end when focusing on an object at infinity, f1 is a focal length of the first lens unit, f2 is a focal length of the second lens unit.

11. The zoom lens according to claim 1, wherein the second lens unit consists of four single lenses.

12. The zoom lens according to claim 1, wherein the Nth lens unit includes a negative lens arranged closest to the object side and a positive lens arranged closest to the image side.

13. The zoom lens according to claim 12, wherein the Nth lens unit consists of two lenses, and the negative lens is a meniscus lens having a concave surface facing the object side.

14. A zoom lens comprising:
a plurality of lens units, the plurality of lens units consisting of, in order from an object side to an image side, a first lens unit having a positive refractive power, a second lens unit having a negative refractive power, a third lens unit having a positive refractive power, a fourth lens unit having a positive refractive power, a fifth lens unit having a negative refractive power, and a sixth lens unit having a negative refractive power as an Nth lens unit,
wherein during zooming, each distance between adjacent lens units changes,
wherein the fifth lens unit and the six lens unit are located on the image side with respect to an aperture stop,
wherein the fifth lens unit consists of one cemented lens including a positive lens and a negative lens,
wherein a combined refractive power of the third lens unit having the aperture stop and the fourth lens unit at a wide-angle end when focusing on an object at infinity is a positive refractive power, and
wherein the following inequalities are satisfied:

$$0.40 < fw/skw < 2.90$$

$$-8.50 < f1/f2 < -5.90$$

$$2.70 < f1/skw < 25.00, \text{ and}$$

where fw is a focal length of the zoom lens at the wide-angle end when focusing on an object at infinity, skw is a back focus at the wide-angle end when focusing on an object at infinity, f1 is a focal length of the first lens unit, and f2 is a focal length of the second lens unit.

* * * * *